US012668885B2

(12) United States Patent
Reinsberg et al.

(10) Patent No.: US 12,668,885 B2
(45) Date of Patent: Jun. 30, 2026

(54) METHOD FOR PRODUCING ALKALI METAL ALCOHOLATES IN AN ELECTROLYSIS CELL

(71) Applicant: EVONIK OPERATIONS GMBH, Essen (DE)

(72) Inventors: Philip Heinrich Reinsberg, Rheinbach (DE); Michael Horn, Niederkassel (DE); Rüdiger Teufert, Cologne (DE); Marc Weiner, Troisdorf (DE)

(73) Assignee: Evonik Operations, GmbH, Essen (DE)

( * ) Notice: Subject to any disclaimer, the term of this patent is extended or adjusted under 35 U.S.C. 154(b) by 0 days.

(21) Appl. No.: 18/688,758

(22) PCT Filed: Aug. 19, 2022

(86) PCT No.: PCT/EP2022/073136
§ 371 (c)(1),
(2) Date: Mar. 2, 2024

(87) PCT Pub. No.: WO2023/030915
PCT Pub. Date: Mar. 9, 2023

(65) Prior Publication Data
US 2025/0122634 A1 Apr. 17, 2025

(30) Foreign Application Priority Data
Sep. 6, 2021 (EP) .................................... 21195065

(51) Int. Cl.
*C25B 3/13* (2021.01)
*C01B 33/36* (2006.01)
(Continued)

(52) U.S. Cl.
CPC .............. *C25B 13/02* (2013.01); *C01B 33/36* (2013.01); *C25B 3/07* (2021.01); *C25B 3/13* (2021.01);
(Continued)

(58) Field of Classification Search
CPC .................................... C25B 3/13; C25B 3/25
(Continued)

(56) References Cited

U.S. PATENT DOCUMENTS 4,831,146 A 5/1989 Taylor et al.
5,389,211 A * 2/1995 Sharifian .................. C25B 3/00 205/508
(Continued)

FOREIGN PATENT DOCUMENTS

CN 102544579 7/2012
CN 112736364 4/2021
(Continued)

OTHER PUBLICATIONS

Kreuer et al., "NASICON Solid Electrolytes Part III: Sodium Conductivity Enhancement Along Domain and Grain Boundaries," Materials Research Bulletin (Feb. 1, 1986), vol. 21, No. 2, pp. 149-159. (Year: 1986).*
(Continued)

*Primary Examiner* — Edna Wong
(74) *Attorney, Agent, or Firm* — Law Office of: Michael A. Sanzo, LLC

(57) ABSTRACT

The invention relates to a method for producing an alkali metal alcoholate solution $L_1$ in an electrolysis cell E which comprises at least one cathode chamber $K_K$, at least one anode chamber $K_A$, and at least one central chamber $K_M$ lying therebetween. The interior $I_{KK}$ of the cathode chamber $K_K$ is separated from the interior $I_{KM}$ of the central chamber $K_M$ by a separating wall W comprising at least one alkali-
(Continued)

Figure 1:
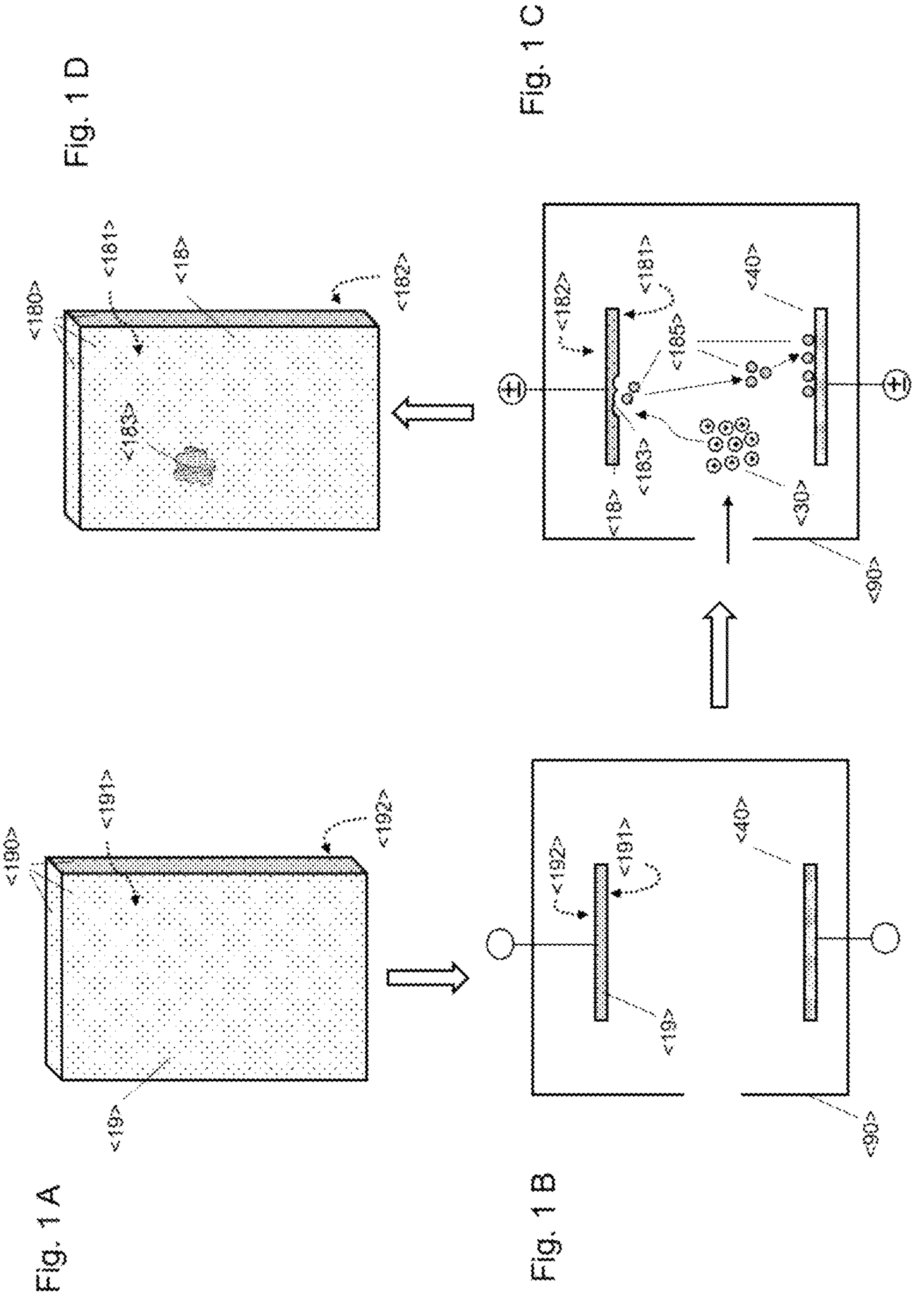

cation-conductive solid ceramic electrolyte (="AFK") F (e.g. NaSICON).

20 Claims, 3 Drawing Sheets

(51) Int. Cl.

| | |
|---|---|
| ***C25B 3/07*** | (2021.01) |
| ***C25B 3/25*** | (2021.01) |
| ***C25B 9/21*** | (2021.01) |
| ***C25B 13/02*** | (2006.01) |
| ***C25B 13/07*** | (2021.01) |
| ***C25B 15/08*** | (2006.01) |

(52) U.S. Cl.
CPC ................ *C25B 9/21* (2021.01); *C25B 13/07* (2021.01); *C25B 15/08* (2013.01)

(58) Field of Classification Search
USPC .................................................. 205/450, 457
See application file for complete search history.

(56) References Cited

U.S. PATENT DOCUMENTS

| | | | | |
|---|---|---|---|---|
| 6,221,225 | B1 | 4/2001 | Mani | |
| 8,093,438 | B2 | 1/2012 | Dimmit et al. | |
| 10,566,654 | B2 | 2/2020 | Ma et al. | |
| 11,174,559 | B2 | 11/2021 | Horn et al. | |
| 11,629,415 | B2 | 4/2023 | Horn et al. | |
| 2006/0226022 | A1 | 10/2006 | Balagopal et al. | |
| 2007/0138020 | A1 | 6/2007 | Balagopal et al. | |
| 2008/0142373 | A1* | 6/2008 | Joshi | C25B 3/25 205/450 |
| 2008/0173540 | A1 | 7/2008 | Joshi et al. | |
| 2010/0044242 | A1 | 2/2010 | Bhavaraju et al. | |
| 2012/0085657 | A1 | 4/2012 | Bhavaraju | |
| 2016/0204459 | A1 | 7/2016 | Henkensmeier et al. | |
| 2019/0292668 | A1 | 9/2019 | Fujinuma | |
| 2022/0267911 | A1 | 8/2022 | Reinsberg et al. | |
| 2024/0384426 | A1 | 11/2024 | Reinsberg et al. | |
| 2024/0392451 | A1 | 11/2024 | Reinsberg et al. | |

FOREIGN PATENT DOCUMENTS

| | | |
|---|---|---|
| DE | 258143 | 7/1988 |
| DE | 4233191 | 7/1993 |
| DE | 10360758 | 7/2005 |
| EP | 4112778 | 1/2023 |
| WO | WO 2005/059205 | 6/2005 |
| WO | WO 2007/048712 | 5/2007 |
| WO | WO 2007/082092 | 7/2007 |
| WO | WO 2008/076327 | 6/2008 |
| WO | WO 2009/059315 | 5/2009 |
| WO | WO 2014/008410 | 1/2014 |
| WO | WO 2023/274794 | 1/2023 |
| WO | WO 2023/274796 | 1/2023 |
| WO | WO 2023/006490 | 2/2023 |
| WO | WO 2023/006493 | 2/2023 |
| WO | WO 2023/016897 | 2/2023 |

OTHER PUBLICATIONS

Sakai et al., "Effects of Surface Roughening of Nafion® on Electrode Plating, Mechanical Strength, and Cell Performances for SPE Water Electrolysis," Journal of The Electrochemical Society (1990), vol. 137, No. 12, pp. 3777-3783. (Year: 1990).*

English language translation of the International Search Report for corresponding international application PCT/EP2022/073136, filed Aug. 19, 2022.

English language translation of the Written Opinion of the International Searching Authority for corresponding international application PCT/EP2022/073136, filed Aug. 19, 2022.

International Preliminary Report on Patentability for corresponding international application PCT/EP2022/073136, filed Aug. 19, 2022.

European Search Report and Search Opinion for EP 21195065 filed Sep. 6, 2021, corresponding to PCT/EP2022/073136; with partial English language machine translation of the Search Opinion.

English language translation of the International Search Report for international application PCT/EP2022/073158, filed Aug. 19, 2022, corresponding to copending U.S. Appl. No. 18/688,762.

English language translation of the Written Opinion of the International Searching Authority for international application PCT/EP2022/073158, filed Aug. 19, 2022, corresponding to copending U.S. Appl. No. 18/688,762.

International Preliminary Report on Patentability for international application PCT/EP2022/073158, filed Aug. 19, 2022, corresponding to copending U.S. Appl. No. 18/688,762.

European Search Report and Search Opinion for EP 21195069 filed Sep. 6, 2021, corresponding to PCT/EP2022/073158; with partial English language machine translation of the Search Opinion.

English language translation of the International Search Report for international application PCT/EP2022/073149, filed Aug. 19, 2022, corresponding to copending U.S. Appl. No. 18/688,757.

English language translation of the Written Opinion of the International Searching Authority for international application PCT/EP2022/073149, filed Aug. 19, 2022, corresponding to copending U.S. Appl. No. 18/688,757.

English language translation of the International Preliminary Report on Patentability for international application PCT/EP2022/073149, filed Aug. 19, 2022, corresponding to copending U.S. Appl. No. 18/688,757.

European Search Report and Search Opinion for EP 21195064 filed Sep. 6, 2021, corresponding to PCT/EP2022/073149; with partial English language machine translation of the Search Opinion.

Anantharamula, et al., "A wide-ranging review on Nasicon type materials," *J. Mater. Sci.* 46:2821-2837 (online Feb. 2011).

Arges, et al., "Anion Exchange Membrane Fuel Cells," *The Electrochemical Society Interface* 19:31-35 (Summer 2010).

Depla, et al., "Sputter deposition processes," in "Handbook of deposition technologies for films and coatings: science applications and technologies," (ed.: P. M. Martin), 3rd ed., Oxford (2010).

Hickner, et al., "Anion Exchange Membranes: Current Status and Moving Forward," *Journal of Polymer Science, Part B* 51:1727-1735 (online Sep. 2013).

Horwat, et al., "Magnetron sputtering of NASICON ($Na_3Zr_2Si_2PO_{12}$) thin films Part I: Limitations of the classical methods," *Surface & Coating Technology* 201:7013-7017 (2007).

Horwat, et al., "Magnetron sputtering of NASICON ($Na_3Zr_2Si_2PO_{12}$) thin films Part II: A novel approach," *Surface & Coating Technology* 201:7060-7065 (2007).

Kreuer, et al., "Nasicon Solid Electrolytes Part III: Sodium Conductivity Enhancement Along Domain and Grain Boundaries," *Mat. Res. Bull.* 21:149-159 (Feb. 1986).

Mareev, et al., "Geometric heterogeneity of homogeneous ion-exchange Neosepta," *Journal of Membrane Science* 563:768-776 (online Jun. 2018).

Sugiawati, et al., "Porous NASICON—Type $Li_3Fe_2(PO_4)_3$ Thin Film Deposited by RF Sputtering as Cathode Material for Li-Ion Microbatteries," *Nonoscale Research Letters* 11:365 (2016).

U.S. Appl. No. 17/650,436, filed Sep. 2, 2022, US-2022/0267911 A1, Aug. 25, 2022, Reinsberg.

U.S. Appl. No. 18/688,757, filed Mar. 2, 2024, Reinsberg.

U.S. Appl. No. 18/688,762, filed Mar. 2, 2024, Reinsberg.

Response to Non Final Office Action filed Jun. 20, 2025 for copending U.S. Appl. No. 18/688,757.

Non Final Office Action mailed Mar. 20, 2025 for copending U.S. Appl. No. 18/688,762.

Non Final Office Action mailed Mar. 28, 2025 for copending U.S. Appl. No. 18/688,757.

Response to Non Final Office Action filed Jun. 16, 2025 for copending U.S. Appl. No. 18/688,762.

Final Office Action mailed Jul. 16, 2025 for copending U.S. Appl. No. 18/688,762.

Examiner Interview Summary mailed Aug. 7, 2025 for copending U.S. Appl. No. 18/688,762.

(56) References Cited

OTHER PUBLICATIONS

Notice of Allowance mailed Aug. 20, 2025 for copending U.S. Appl. No. 18/688,762.
Corrected Notice of Allowance mailed Sep. 4, 2025 for copending U.S. Appl. No. 18/688,762.
Amendment & Response to Final Office Action filed Sep. 25, 2025 for copending U.S. Pat. No. 18,688,757.
RCE to Accompany Amendment & Response to Final Office Action filed Sep. 25, 2025 for copending U.S. Pat. No. 18,688,757.
Notice of Allowance mailed Nov. 19, 2025 for copending U.S. Appl. No. 18/688,757.
Shao, et al., "A novel NASICON-based glass-ceramic composite electrolyte with enhanced Na-ion conductivity," Energy Storage materials 23:514-521 (2019).

* cited by examiner

<190>
<191>
<192>
<19>
<40>
<90>
<180>
<181>
<182>
<183>
<18>
<185>
<30>

METHOD FOR PRODUCING ALKALI METAL ALCOHOLATES IN AN ELECTROLYSIS CELL

CROSS REFERENCE TO RELATED APPLICATIONS

The present application is US national stage of international application PCT/EP2022/073136, which had an international filing date of Aug. 19, 2022 and which was published on Mar. 9, 2023. The PCT application claims priority to EP 21195065.4, filed on Sep. 6, 2021. The content of these prior filings is hereby incorporated by reference in their entirety.

The present invention relates to a process for producing an alkali metal alkoxide solution $L_1$ in an electrolysis cell E comprising at least one cathode chamber $K_K$, at least one anode chamber $K_A$, and at least one interposed middle chamber $K_M$.

The interior $I_{KK}$ of the cathode chamber $K_K$ is divided by a dividing wall W comprising at least one alkali metal cation-conducting solid-state electrolyte ceramic (="ASC") F (e.g. NaSICON) from the interior $I_{KM}$ of the middle chamber $K_M$. F has the surface $O_F$, and a portion $O_{A/MK}$ of this surface $O_F$ makes direct contact with the interior $I_{KM}$, and a portion $O_{KK}$ of this surface $O_F$ makes direct contact with the interior $I_{KK}$.

The surface $O_{A/MK}$ and/or the surface $O_{KK}$ comprises at least a portion of a surface $O_{F\Delta}$. $O_{F\Delta}$ results from a pretreatment step in which F is produced from an ASC F' having the surface $O_{F'}$.

In the pretreatment step, by sputtering the surface $O_{F'}$ with noble gas cations $N^+$, ASC is removed from F', and the ASC F is obtained with the surface $O_F$ comprising the surface $O_{F\Delta}$ formed by the sputtering.

The electrolysis for production of the alkali metal alkoxides with F rather than F results in improved conductivity, which makes it possible to use a lower voltage at constant current density.

1. BACKGROUND OF THE INVENTION

The electrochemical production of alkali metal alkoxide solutions is an important industrial process which is described, for example, in DE 103 60 758 A1, US 2006/0226022 A1 and WO 2005/059205 A1. The principle of these processes is reflected in an electrolysis cell in which the solution of an alkali metal salt, for example sodium chloride or NaOH, is present in the anode chamber, and the alcohol in question or an alcoholic solution with a low concentration of the alkali metal alkoxide in question, for example sodium methoxide or sodium ethoxide, is present in the cathode chamber. The cathode chamber and the anode chamber are separated by a ceramic that conducts the alkali metal ion used, for example NaSICON or an analogue for potassium or lithium. On application of a current, chlorine forms at the anode—when a chloride salt of the alkali metal is used—and hydrogen and alkoxide ions at the cathode. The charge is balanced in that alkali metal ions migrate from the middle chamber into the cathode chamber via the ceramic that is selective therefor. The balancing of charge between middle chamber and anode chamber results from the migration of cations when cation exchange membranes are used or the migration of anions when anion exchange membranes are used, or from migration of both ion types when nonspecific diffusion barriers are used. This increases the concentration of the alkali metal alkoxide in the cathode chamber, and the concentration of the sodium ions in the anolyte is lowered.

NaSICON solid-state electrolytes are also used in the electrochemical production of other compounds:

WO 2014/008410 A1 describes an electrolytic process for producing elemental titanium or rare earths. The basis of this process is that titanium chloride is formed from $TiO_2$ and the corresponding acid, and this is reacted with sodium alkoxide to give titanium alkoxide and NaCl and finally converted electrolytically to elemental titanium and sodium alkoxide.

WO 2007/082092 A2 and WO 2009/059315 A1 describe processes for producing biodiesel, in which, with the aid of alkoxides produced electrolytically by means of NaSICON, triglycerides are first converted to the corresponding alkali metal triglycerides and are reacted in a second step with electrolytically generated protons to give glycerol and the respective alkali metal hydroxide.

However, one disadvantage of the electrolysis cells described in the prior art is that the resistance of the solid-state electrolyte ceramics used therein is relatively high. This increases the specific energy consumption of the electrolytically produced materials, and there is also a deterioration in the energy-specific data (current, voltage) of the cell. Ultimately, the overall process becomes uneconomic.

It was accordingly an object of the present invention to provide a process for producing an alkali metal alkoxide solution in an electrolysis cell, which does not have this disadvantage.

A further disadvantage of conventional electrolysis cells in this technical field arises from the fact that the solid-state electrolyte does not have long-term stability with respect to aqueous acids. This is problematic in that, during the electrolysis in the anode chamber, the pH falls as a result of oxidation processes (for example in the case of production of halogens by disproportionation or by oxygen formation). These acidic conditions attack the NaSICON solid-state electrolyte to such a degree that the process cannot be used on an industrial scale. In order to counter this problem, various approaches have been described in the prior art.

For instance, three-chamber cells have been proposed in the prior art. These are known in the field of electrodialysis, for example U.S. Pat. No. 6,221,225 B1.

WO 2012/048032 A2 and US 2010/0044242 A1 describe, for example, electrochemical processes for producing sodium hypochlorite and similar chlorine compounds in such a three-chamber cell. The cathode chamber and the middle chamber of the cell are separated here by a solid-state electrolyte permeable to cations, for example NaSICON. In order to protect this from the acidic anolyte, the middle chamber is supplied, for example, with solution from the cathode chamber. US 2010/0044242 A1 also describes, in FIG. 6, the possibility of mixing solution from the middle chamber with solution from the anode chamber outside the chamber in order to obtain sodium hypochlorite.

Such cells have also been proposed in the prior art for the production or purification of alkali metal alkoxides.

For instance, U.S. Pat. No. 5,389,211 A describes a process for purifying alkoxide solutions in which a three-chamber cell is used, in which the chambers are delimited from one another by cation-selective solid-state electrolytes or else nonionic dividing walls. The middle chamber is used as buffer chamber in order to prevent the purified alkoxide or hydroxide solution from the cathode chamber from mixing with the contaminated solution from the anode chamber.

DE 42 33 191 A1 describes the electrolytic recovery of alkoxides from salts and alkoxides in multichamber cells and stacks of multiple cells.

WO 2008/076327 A1 describes a process for producing alkali metal alkoxides. This uses a three-chamber cell, the middle chamber of which has been filled with alkali metal alkoxide (see, for example, paragraphs [0008] and [0067] of WO 2008/076327 A1). This protects the solid-state electrolyte separating the middle chamber and the cathode chamber from the solution present in the anode chamber, which becomes more acidic in the course of electrolysis. A similar arrangement is described by WO 2009/073062 A1. However, this arrangement has the disadvantage that the alkali metal alkoxide solution which is consumed as buffer solution and continuously contaminated is the desired product. A further disadvantage of the process described in WO 2008/076327 A1 is that the formation of the alkoxide in the cathode chamber depends on the diffusion rate of the alkali metal ions through two membranes or solid-state electrolytes. This in turn leads to slowing of the formation of the alkoxide.

A further problem results from the geometry of the three-chamber cell. The middle chamber in such a chamber is separated from the anode chamber by a diffusion barrier and from the cathode chamber by an ion-conducting ceramic. During the electrolysis, this results unavoidably in development of pH gradients and in dead volumes. This can damage the ion-conducting ceramic and, as a result, increase the voltage demand of the electrolysis and/or lead to fracture of the ceramic.

While this effect takes place throughout the electrolysis chamber, the drop in pH is particularly critical in the middle chamber since this is bounded by the ion-conducting ceramic. Gases are typically formed at the anode and the cathode, such that there is at least some degree of mixing in these chambers. By contrast, no such mixing takes place in the middle chamber, such that the pH gradient develops therein. This unwanted effect is enhanced by the fact that the brine is generally pumped relatively slowly through the electrolysis cell.

A further object of the present invention was accordingly that of providing an improved process for electrolytic production of alkali metal alkoxide. This is not to have the aforementioned disadvantages, and is especially to assure improved protection of the solid-state electrolyte prior to the formation of the pH gradient and more sparing use of the reactants compared to the prior art.

2. BRIEF DESCRIPTION OF THE INVENTION

The objects of the invention are achieved by the process discussed herein.

3. FIGURES

The figures show preferred embodiments of the process according to the invention.

3.1 FIGS. 1A to 1D

FIGS. 1A (="FIG. 1A"), 1B (="FIG. 1B"), 1C (="FIG. 1C"), and 1D (="FIG. 1D") illustrate steps (i) and (ii) of the process according to the invention.

FIG. 1A shows an alkali metal cation-conducting solid-state electrolyte ceramic F' <19>, as provided in step (i). This has a surface $O_F$ <190>. The surface $O_F$ <190> comprises, for example, two subregions; in FIG. 1A, these are the opposite areas identified by reference numerals <191> and <192>, of which the rear one <192> is hidden.

The ASC F' <19>, as shown in FIG. 1B, is disposed in a process chamber <90> as "target" with respect to a substrate film <40> such that the surface subregion <191> lies opposite the film <40>, while the surface subregion <192> faces away from it. The substrate film <40> is optional, since the sputtering of the target can also be undertaken without it.

FIG. 1C shows the step of sputtering, in which the HF (high frequency; also "radiofrequency", "RF") variant is employed. In the process chamber <90>, under fine vacuum, ($10^{-1}$ to $10^{-2}$ mbar), a plasma of argon cations $N^+$ <30> and electrons is generated, and an AC field (indicated by the symbol "±") with a negative offset voltage at the target, the ASC F' <19>, is generated by means of a high-frequency voltage source connected in series with a capacitor and the plasma (not shown in FIG. 1C).

The argon anions $N^+$ <30> are accelerated in the direction of the target ASC F' <19> and strip ASC away from it. The dust particles <185> thus generated are scattered in the direction of the substrate <40> and are precipitated there (and on the walls of the process chamber <90>).

This process step affords an ASC F <18>, the surface $O_F$ <180> of which has a part-surface $O_{A/MK}$ <181> facing the substrate <40> and a part-surface $O_{KK}$ <182> facing away from the substrate <40>. $O_{A/MK}$ <181> in turn comprises a subregion $O_{F\Delta}$ <183> that has formed by virtue of removal of ASC from F' <19> by means of sputtering.

FIG. 1D shows the ASC F <18> thus obtained, which is obtained after step (ii). This has a surface $O_F$ <180>. The surface $O_F$ <180> comprises the two subregions $O_{A/MK}$ <181> and $O_{KK}$ <182>. F <18> corresponds to F' <19>, or the surface $O_F$ <180> corresponds to the surface $O_{F'}$<190>, with the difference that $O_{A/MK}$ <181> includes the subregion $O_{F\Delta}$ <183>. On account of this subregion $O_{F\Delta}$ <183>, $S_{MF}$, which is the mass-based specific surface area $S_M$ of the ASC F <18>, is greater than $S_{MF'}$, which is the mass-based specific surface area $S_M$ of the ASC F' <19>.

Figure 2:
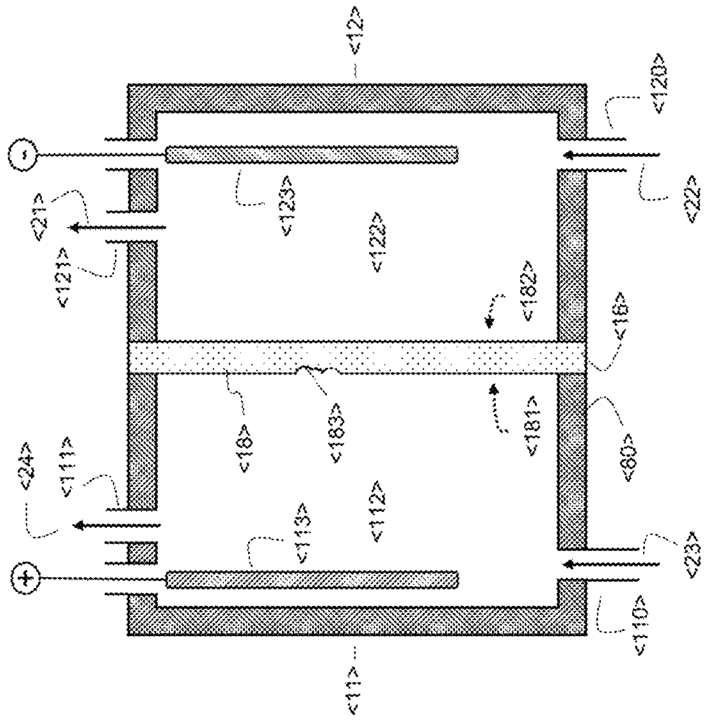
Figure 2:
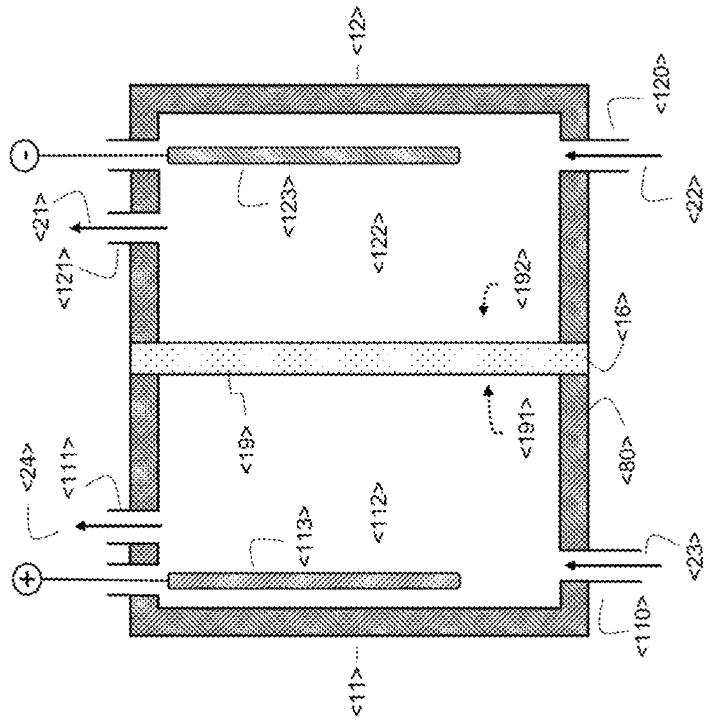

3.2 FIGS. 2A and 2B

FIG. 2A (="FIG. 2A") shows a noninventive embodiment in the form of an electrolysis cell which is a two-chamber cell.

This electrolysis cell comprises a cathode chamber $K_K$ <12> and an anode chamber $K_A$ <11>.

The anode chamber $K_A$ <11> comprises an anodic electrode $E_A$ <113> in the interior $I_{KA}$ <112>, an inlet $Z_{KA}$ <110> and an outlet $A_{KA}$ <111>.

The cathode chamber $K_K$ <12> comprises a cathodic electrode $E_K$ <123> in the interior $I_{KK}$ <122>, an inlet $Z_{KK}$ <120> and an outlet $A_{KK}$ <121>.

The electrolysis cell is bounded by an outer wall $W_A$ <80>.

The interior $I_{KK}$ <122> is also divided from the interior $I_{KA}$ <112> by a dividing wall W <16> consisting of a sheet of an NaSICON solid-state electrolyte ceramic F' <19> which is selectively permeable to sodium ions and has a surface $O_{F'}$<190>. The NaSICON solid-state electrolyte ceramic F' <19> extends over the entire depth and height of the two-chamber cell. The NaSICON solid-state electrolyte ceramic F' <19> makes direct contact with the two interiors $I_{KK}$ <122> and $I_{KA}$ <112> via the part-surfaces <192> and <191>, such that sodium ions can be routed from one interior into the other through the NaSICON solid-state electrolyte ceramic F' <19>. In FIGS. 2A and 2B, the respective alkali metal cation-conducting solid-state electrolyte ceramic F' <19> or F <18> is arranged in the respective electrolysis cell such that the area shaded in FIGS. 1A and 1D faces the user in FIGS. 2A and 2B.

An aqueous solution of sodium chloride $L_3$ <23> with pH 10.5 is introduced via the inlet $Z_{KA}$ <110>, counter to the direction of gravity, into the interior $I_{KA}$ <112>.

A solution of sodium methoxide in methanol $L_2$ <22> is routed into the interior $I_{KK}$ <122> via the inlet $Z_{KK}$ <120>.

At the same time, a voltage is applied between the cathodic electrode $E_K$ <123> and the anodic electrode $E_A$ <113>. This results in reduction of methanol in the electrolyte $L_2$ <22> to give methoxide and $H_2$ in the interior $I_{KK}$ <122> ($CH_3OH+e^- \rightarrow CH_3O^- + \frac{1}{2} H_2$). At the same time, sodium ions diffuse from the interior $I_{KA}$ <112> through the NaSICON solid-state electrolyte F <18> into the interior $I_{KK}$ <122>. Overall, this increases the concentration of sodium methoxide in the interior $I_{KK}$ <122>, which affords a methanolic solution of sodium methoxide $L_1$ <21> having an elevated sodium methoxide concentration compared to $L_2$ <22>.

In the interior $I_{KA}$ <112>, the oxidation of chloride ions takes place to give molecular chlorine ($Cl^- \rightarrow \frac{1}{2} Cl_2 + e^-$). In the outlet $A_{KA}$ <111>, an aqueous solution $L_4$ <24> is obtained, in which the content of NaCl is reduced compared to $L_3$ <23>. Chlorine gas ($Cl_2$) forms in water, according to the reaction $Cl_2+H_2O \rightarrow HOCl+HCl$, hypochlorous acid and hydrochloric acid, which give an acidic reaction with further water molecules. The acidity damages the NaSICON solid-state electrolyte ceramic F' <19>.

FIG. 2B (="FIG. 2B") shows a further embodiment of a noninventive process. The electrolysis cell E corresponds to the arrangement shown in FIG. 2A, with the difference that a NaSICON solid-state electrolyte ceramic F <18> which has the surface $O_F$ <180> and has been pretreated by the method according to FIGS. 1A to 1D is utilized as dividing wall W <16>. F <18> has a part-surface $O_{KK}$ <182> that makes direct contact with the interior $I_{KK}$ <122> and a part-surface $O_{A/MK}$ <181> that makes direct contact with the interior $I_{KA}$ <112>. The NaSICON solid-state electrolyte F <18> was obtained by a sputtering method in accordance with FIGS. 1A to 1D. The NaSICON solid-state electrolyte ceramic F <18> obtained has, by contrast with F' <19>, the subregion $O_{F\Delta}$<183> that has formed as a result of the sputtering method on the part-surface $O_{A/MK}$ <181>. As a result, the NaSICON solid-state electrolyte ceramic F <18> has a greater mass-based specific surface area $S_{MF}$ than that ($S_{MF'}$) of the alkali metal cation-conducting solid-state electrolyte ceramic F' <19>. This leads to better conductivity, i.e. to a reduction in voltage at the same current density during electrolysis, which leads to an energy-saving.

Figure 3:
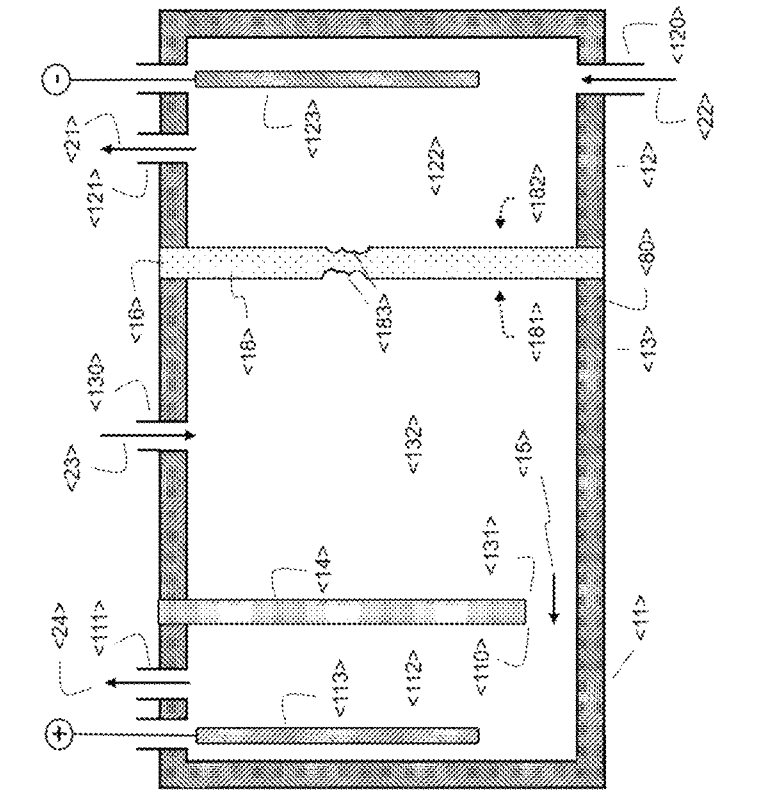
Figure 3:
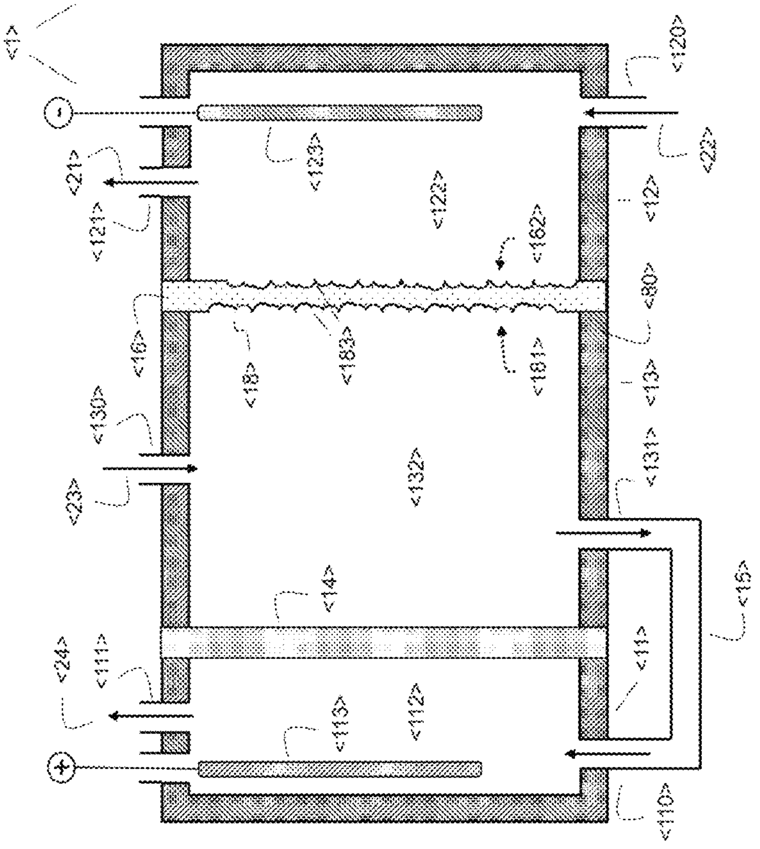

3.3 FIGS. 3A and 3B

FIG. 3A (="FIG. 3A") shows one embodiment of the process according to the invention.

It show the process according to the invention in the form of an electrolysis cell E <1> which is a three-chamber cell.

The three-chamber electrolysis cell E <1> comprises a cathode chamber $K_K$ <12>, an anode chamber $K_A$ <11> and an interposed middle chamber $K_M$ <13>.

The anode chamber $K_A$ <11> comprises an anodic electrode $E_A$ <113> in the interior $I_{KA}$ <112>, an inlet $Z_{KA}$<110> and an outlet $A_{KA}$ <111>.

The cathode chamber $K_K$ <12> comprises a cathodic electrode $E_K$ <123> in the interior $I_{KK}$ <122>, an inlet $Z_{KK}$ <120> and an outlet $A_{KK}$ <121>.

The middle chamber $K_M$ <13> comprises an interior $I_{KM}$ <132>, an inlet $Z_{KM}$ <130> and an outlet $A_{KM}$ <131>. The interior $I_{KA}$ <112> is connected to the interior $I_{KM}$ <132> via the connection $V_{AM}$ <15>.

The electrolysis cell E <1> is bounded by an outer wall $W_A$ <80>.

The interior $I_{KK}$ <122> is also divided from the interior $I_{KM}$ <132> by a dividing wall W <16> consisting of a sheet of an NaSICON solid-state electrolyte ceramic F <18> which is selectively permeable to sodium ions and has the surface $O_F$ <180>. This surface has a part-surface $O_{KK}$ <182> that makes direct contact with the interior $I_{KK}$ <122> and a part-surface $O_{A/MK}$ <181> that makes direct contact with the interior $I_{KM}$ <132>. The NaSICON solid-state electrolyte ceramic F <18> extends over the entire depth and height of the three-chamber cell E <1>. F <18> is obtained by a sputtering method corresponding to the method shown in FIGS. 1A to 1D from the NaSICON solid-state electrolyte F' <19> and, by contrast with F' <19>, has the subregion $O_{F\Delta}$<183> that has formed as a result of process step (ii) on the part-surface $O_{A/MK}$<181>. Compared to the NaSICON solid-state electrolyte ceramic F <18> shown in FIG. 2B, the surface $O_{F\Delta}$ <183> obtained by process step (ii) is larger in the NaSICON solid-state electrolyte ceramic F <18> according to FIG. 3A. In addition, not only was the part-surface $O_{A/MK}$<181> sputtered, but also the part-surface $O_{KK}$ <182>, which still further increases the mass-based specific surface area $S_{MF}$. This more extended processing is achieved by sputtering over a larger area on both sides of F' <19>.

As a result, the NaSICON solid-state electrolyte F <18> has an even greater mass-based specific surface area $S_{MF}$ than that ($S_{MF'}$) of the alkali metal cation-conducting solid-state electrolyte ceramic F' <19>. This leads to an even better conductivity.

F <18> makes direct contact with the two interiors $I_{KK}$ <122> and $I_{KM}$ <132>, such that sodium ions can be routed from one interior into the other through the NaSICON solid-state electrolyte ceramic F <18>.

The interior $I_{KM}$ <132> of the middle chamber $K_M$ <13> is additionally divided in turn from the interior $I_{KA}$ <112> of the anode chamber $K_A$ <11> by a diffusion barrier D <14>. The NaSICON solid-state electrolyte ceramic F <18> and the diffusion barrier D <14> extend over the entire depth and height of the three-chamber cell E <1>. The diffusion barrier D <14> is a cation exchange membrane (sulfonated PTFE).

In the embodiment according to FIG. 3A, the connection $V_{AM}$ <15> is formed outside the electrolysis cell E <1>, especially by a tube or hose, the material of which may be selected from rubber, metal and plastic. The connection $V_{AM}$ <15> can guide liquid from the interior $I_{KM}$ <132> of the middle chamber $K_M$ <13> into the interior $I_{KA}$ <112> of the anode chamber $K_A$ <11> outside the three-chamber cell E <1>. The connection $V_{AM}$ <15> connects an outlet $A_{KM}$ <131> that penetrates the outer wall $W_A$ <80> of the electrolysis cell E <1> at the base of the middle chamber $K_M$ <13> to an inlet $Z_{KA}$<110> that penetrates the outer wall $W_A$ <80> of the electrolysis cell E at the base of the anode chamber $K_A$ <11>.

An aqueous solution of sodium chloride $L_3$ <23> with pH 10.5 is introduced via the inlet $Z_{KM}$ <130>, in the direction of gravity, into the interior $I_{KM}$<132> of the middle chamber $K_M$ <13>. The connection $V_{AM}$ <15> formed between the outlet $A_{KM}$<131> from the middle chamber $K_M$<13> and an inlet $Z_{KA}$<110> to the anode chamber $K_A$ <11> connects the interior $I_{KM}$ <132> of the middle chamber $K_M$ <13> to the interior $I_{KA}$ <112> of the anode chamber $K_A$ <11>. Sodium chloride solution $L_3$ <23> is routed through this connection $V_{AM}$ <15> from the interior $I_{KM}$ <132> into the interior $I_{KA}$ <112>.

A solution of sodium methoxide in methanol $L_2$ <22> is routed into the interior $I_{KK}$ <122> via the inlet $Z_{KK}$ <120>.

At the same time, a voltage is applied between the cathodic electrode $E_K$ <123> and the anodic electrode $E_A$ <113>. This results in reduction of methanol in the electrolyte $L_2$ <22> to give methoxide and $H_2$ in the interior $I_{KK}$ <122> ($CH_3OH+e^- \rightarrow CH_3O^- + \frac{1}{2} H_2$). At the same time, sodium ions diffuse from the interior $I_{KM}$ <132> of the middle chamber $K_M$ <103> through the NaSICON solid-state electrolyte F <18> into the interior $I_{KK}$ <122>. Overall, this increases the concentration of sodium methoxide in the interior $I_{KK}$ <122>, which affords a methanolic solution of sodium methoxide $L_1$ <21> having an elevated sodium methoxide concentration compared to $L_2$ <22>.

In the interior $I_{KA}$ <112>, the oxidation of chloride ions takes place to give molecular chlorine ($Cl^- \rightarrow \frac{1}{2} Cl_2 + e^-$). In the outlet $A_{KA}$ <111>, an aqueous solution $L_4$ <24> is obtained, in which the content of NaCl is reduced compared to $L_3$ <23>. Chlorine gas ($Cl_2$) forms in water, according to the reaction $Cl_2+H_2O \rightarrow HOCl+HCl$, hypochlorous acid and hydrochloric acid, which give an acidic reaction with further water molecules. The acidity would damage the NaSICON solid-state electrolyte F <18>, but is restricted to the anode chamber $K_A$ <11> by the arrangement in the three-chamber cell, and hence kept away from the NaSICON solid-state electrolyte ceramic F <18> in the electrolysis cell E. This considerably increases the lifetime thereof.

FIG. 3B (="FIG. 3B") shows a further embodiment of the process according to the invention. This is conducted in an electrolysis cell E <1> which corresponds to the electrolysis cell E <1> shown in FIG. 3A, with the following difference:

The connection $V_{AM}$ <15> from the interior $I_{KM}$ <132> of the middle chamber $K_M$ <13> to the interior $I_{KA}$ <112> of the anode chamber $K_A$ <11> is formed not outside the electrolysis cell E <1>, but rather inside the electrolysis cell E <1>, through a perforation in the diffusion barrier D <14>. This perforation may be introduced into the diffusion barrier D <14> subsequently (for instance by stamping, drilling) or may already have been present therein from the outset on account of the production of the diffusion barrier D <14> (for example in the case of textile fabrics such as filter cloths or metal weaves).

As in the embodiment according to FIG. 3A, not only is the part-surface $O_{A/MK}$ <181> sputtered, but also part-surface $O_{KK}$ <182>, which still further increases the mass-based specific surface area $S_{MF}$. However, $O_{F\Delta}$ <183> is smaller than in the embodiment according to FIG. 3A.

4. DETAILED DESCRIPTION OF THE INVENTION

4.1 Step (i)

In step (i) of the process according to the invention, an alkali metal cation-conducting solid-state electrolyte ceramic (="ASC") F' having the surface $O_{F'}$ is provided.

The ASC F' provided in step (i) is subjected to step (ii) in the process according to the invention and, after step (ii), the ASC F is obtained with the surface $O_F$. Since F is essentially obtained from F' by removing a portion of ASC from F' in step (ii) in order to arrive at F, F' and F have essentially the same chemical structure.

A useful alkali metal cation-conducting solid-state electrolyte ceramic F', and especially also F, is any solid-state electrolyte by which cations, especially alkali metal cations, even more preferably sodium cations, can be transported from $I_{KM}$ into $I_{KK}$. Such solid-state electrolytes are known to the person skilled in the art and are described, for example, in DE 10 2015 013 155 A1, in WO 2012/048032 A2, paragraphs [0035], [0039], [0040], in US 2010/0044242 A1, paragraphs [0040], [0041], in DE 10360758 A1, paragraphs [014] to [025]. They are sold commercially under the NaSICON, LiSICON, KSICON name. A sodium ion-conducting solid-state electrolyte ceramic F is preferred, and this even more preferably has an NaSICON structure. NaSICON structures usable in accordance with the invention are also described, for example, by N. Anantharamulu, K. Koteswara Rao, G. Rambabu, B. Vijaya Kumar, Velchuri Radha, M. Vithal, *J Mater Sci* 2011, 46, 2821-2837.

In a preferred embodiment, the alkali metal cation-conducting solid-state electrolyte ceramic F', and especially also F, has an NaSICON structure of the formula $$M^{I}_{1+2w+x-y+z}M^{II}_{w}M^{III}_{x}Zr^{IV}_{2-w-x-y}M^{V}_{y}(SiO_4)_z(PO_4)_{3-z}.$$

$M^I$ here is selected from $Na^+$, $Li^+$, preferably $Na^+$.

$M^{II}$ here is a divalent metal cation, preferably selected from $Mg^{2+}$, $Ca^{2+}$, $Sr^{2+}$, $Ba^{2+}$, $Co^{2+}$, $Ni^{2+}$, more preferably selected from $Co^{2+}$, $Ni^{2+}$.

$M^{III}$ here is a trivalent metal cation, preferably selected from $Al^{3+}$, $Ga^{3+}$, $Sc^{3+}$, $La^{3+}$, $Y^{3+}$, $Gd^{3+}$, $Sm^{3+}$, $Lu^{3+}$, $Fe^{3+}$, $Cr^{3+}$, more preferably selected from $Sc^{3+}$, $La^{3+}$, $Y^{3+}$, $Gd^{3+}$, $Sm^{3+}$, especially preferably selected from $Sc^{3+}$, $Y^{3+}$, $La^{3+}$.

$M^V$ here is a pentavalent metal cation, preferably selected from $V^{5+}$, $Nb^{5+}$, $Ta^{5+}$.

The Roman indices I, II, III, IV, V indicate the oxidation numbers in which the respective metal cations exist.

w, x, y, z are real numbers, where $0 \le x < 2$, $0 \le y < 2$, $0 \le w < 2$, $0 \le z < 3$, and where w, x, y, z are chosen such that $1+2w+x-y+z \ge 0$ and $2-w-x-y \ge 0$.

Even more preferably in accordance with the invention, the NaSICON structure has a structure of the formula $Na_{(1+v)}Zr_2Si_vP_{(3-v)}O_{12}$ where v is a real number for which $0 \le v \le 3$. Most preferably, v=2.4.

In a preferred embodiment of the process according to the invention, the alkali metal cation-conducting solid-state electrolyte ceramics F and F have the same structure.

4.2 Step (ii)

In step (ii) of the process according to the invention, a portion of the alkali metal cation-conducting solid-state electrolyte ceramic F' is removed by sputtering with noble gas cations $N^+$, preferably cations of argon, neon, krypton, xenon, even more preferably cations of argon.

The noble gas cations $N^+$ are present in step (ii) in the form of plasma in particular.

This affords an alkali metal cation-conducting solid-state electrolyte ceramic F with the surface $O_F$, where the surface $O_F$ differs from the surface OF' in at least one subregion $O_{F\Delta}$, and where the surface $O_F$ comprises the surfaces $O_{A/MK}$ and $O_{KK}$, where $O_{A/MK}$ and/or $O_{KK}$ comprise at least a portion of $O_{F\Delta}$, and where in particular $O_{A/MK}$ and $O_{KK}$ comprise at least a portion of $O_{F\Delta}$.

4.2.1 Sputtering

"Sputtering" ("atomizing") is a method known to the person skilled in the art for treatment of surfaces, which is described by the following authors for example:

Chapter 7 ("Sputtern"; pages 147-190) of the book "Oberflächentechnologie mit Niederdruckplasmen" [Surface Technology with Low-Pressure Plasmas] by Gerhard Franz, 1994, Springer-Verlag Berlin Heidelberg;

D. Horwat, J. F. Pierson, A. Billard, Surface & Coatings Technology 2007, 201, 7013-7017 and 7060-7065;

V. A. Sugiawati, F. Vacandio, M. Eyraud, P. Knauth, T. Djenizian, Nanoscale Research Letters 2016, 11, 365;

D. Depla, S. Mahieu, J. E. Greene, "Sputter Deposition Processes" (Seiten 253-296) in "Handbook of deposition technologies for films and coatings: science, applications and technology", (ed.: P. M. Martin), 3rd edition, 2010, Oxford.

In general, the sputtering involves treating the surface of a particular body.

In step (ii), the sputtering with noble gas cations $N^+$ partly strips ASC away from F'.

The conditions of the sputtering, especially the generation of a plasma of the noble gas cations $N^+$, the arrangement of the ASC F', the power with which the noble gas cations $N^+$ are shot onto the surface $O_{F'}$ of the ASC F' (i.e. their energy), can be established by the person skilled in the art in accordance with their knowledge in the art.

The extent to which ASC is stripped from F' can likewise be controlled by the person skilled in the art via the selection of the noble gas N, the adjustment of the energy of $N^+$ and the time for which F' is sputtered.

For this purpose, F' is preferably disposed in a suitable process chamber.

In particular, a high vacuum (especially $10^{-4}$ to $10^{-1}$, preferably $10^{-2}$ to $10^{-1}$ mbar) is applied in the process chamber, a noble gas N is introduced and an electrical field is generated, in which the body to be treated (the "target") is set up as one pole, as the cathode for example in the case of DC sputtering.

The electrical field, according to the sputtering variant, may be a DC field ("DC sputtering") or an AC field ["high-frequency (HF) sputtering" or "radiofrequency (RF) sputtering" ]. The latter is typically generated by series connection of a high-frequency voltage source with a capacitor and the plasma. Optionally, the electrical field may also be overlaid with a magnetic field. Especially in the case of targets having insufficient conductivity, preference is given to working in an alternating field in order to avoid charging of the target.

In step (ii) of the process according to the invention, preference is given to applying an alternating field in the sputtering operation.

The electrical field generates a plasma of noble gas cations $N^+$ that are accelerated in the direction of the target, where they "knock out", i.e. strip, atoms from the target. The adjustment of the energy of the noble gas cations $N^+$ which is required for the purpose may be undertaken by the person skilled in the art in accordance with their knowledge in the art. The person skilled in the art is aware here of what energy of the noble gas cations $N^+$ has to be established for them to strip away a maximum proportion of ASC at the surface $O_{F'}$ and to cause a minimum proportion of unwanted side reactions, for example incorporation of $N^+$ into the lattice structure of F'.

In step (ii) of the process according to the invention, the noble gas cations $N^+$ preferably have an energy in the range from 1 to 100 keV, more preferably in the range from 5 to 70 keV, even more preferably in the range from 10 to 50 keV, even more preferably in the range from 20 to 40 keV. The energy may be determined by the person skilled in the art using their knowledge in the art (for example by adjusting the strength of the alternating field or DC field depending on the particular noble gas N used). Within these ranges, it is assured to a particularly high degree that ASC is stripped away by sputtering, and side effects such as incorporation of $N^+$ into the crystal structure of the ASC are suppressed.

The duration over which the surface $O_{F'}$ is sputtered with noble gas cations $N^+$ is especially >1 min, preferably more than 30 min, preferably more than 60 min, even more preferably more than 120 min.

In step (ii) of the process according to the invention, noble gas cations NW are used. These are preferably in the form of a plasma.

Preference is given here to generating a plasma of the noble gas cations N in an alternating field, which is even more preferably overlaid with a magnetic field. The noble gas cations $N^+$ are preferably those in which the noble gas N is selected from the group consisting of helium, neon, argon, krypton, xenon, radon, more preferably from the group consisting of neon, argon, krypton, xenon, more preferably from argon, krypton, xenon. Most preferably, the noble gas cations $N^+$ are argon cations.

In an optional embodiment, the noble gas cations $N^+$ are present in a mixture with a reactive gas, especially selected from nitrogen, oxygen, preferably nitrogen. This gas increases the stripping rate of the ASC from F', since it can react with the stripped ASC particles.

In step (ii) of the process according to the invention, the pressure is preferably within a range from $10^{-4}$ to $10^{-1}$ mbar, more preferably in the range from $10^{-3}$ to $10^{-1}$ mbar, even more preferably in the range from $10^{-2}$ to $10^{-1}$ mbar.

The sputtering in step (ii) can treat the entire surface $O_{F'}$. This is possible in that, for example, a portion of the surface $O_{F'}$ is first sputtered in a first substep, especially facing the plasma and hence the noble gas cations $N^+$ and being sputtered thereby, and ASC is stripped away in this portion of the surface $O_{F'}$, and then, in a second substep, the side of F' that the plasma has not reached in the first substep is sputtered, especially facing the plasma and hence the noble gas cations $N^+$ and being sputtered thereby, and hence stripping away ASC there.

If the entire surface $O_{F'}$ is treated in step (ii), the surface $O_F$ of the resultant ASC F differs completely from $O_{F'}$, meaning that $O_F$ and $O_{F\Delta}$ are identical.

Alternatively and preferably, in step (ii), it is also possible to treat just part of the surface $O_{F'}$. This is possible, for example, in that just a portion of the surface $O_{F'}$ is sputtered, especially facing the plasma and hence the noble gas cations N and being sputtered thereby, and ASC is removed only in this part of the surface $O_{F'}$. In addition, a portion of the surface $O_{F'}$ may also be covered with a template, such that just part of the surface $O_{F'}$ is removed from the noble gas cations $N^+$. In this case, an ASC F is obtained, the surface $O_F$ of which is still partly identical to the surface $O_{F'}$ of F and differs from $O_{F'}$ in the portion $O_{F\Delta}$.

In the embodiment of the present invention in which just a portion of the surface $O_{F'}$ is treated in step (ii) and the surface $O_F$ of the ASC F obtained does not differ completely, but differs only partly, from $O_{F'}$, the shape of $O_{F\Delta}$, if $O_{F\Delta}$ is encompassed only at least partly by $O_{A/MK}$ and/or $O_{KK}$, is subject to no further restriction. For example, $O_{F\Delta}$ may form a coherent subregion on the surface $O_F$. Alternatively, $O_{F\Delta}$ may be formed by multiple unconnected subregions on the surface $O_F$, such that the shape thereof is reminiscent of the shape of the black spots (which would correspond to $O_F$A) on the white coat (which would correspond to $O_F$) of the Dalmatian breed of dog.

It is preferable that the surface $O_{F'}$ of the ASC F' is treated in step (ii) such that the area $O_{F\Delta}$ formed by sputtering in the resulting ASC F comprises at least one of the surface portions $O_{A/MK}$ and $O_{KK}$, and preferably comprises both. It is very particularly preferable that the part $O_{F\Delta}$ of the surface $O_F$ formed by sputtering coincides with at least one of the parts $O_{A/MK}$, $O_{KK}$ ($O_{F\Delta}=O_{A/MK}$ or $O_{F\Delta}=O_{KK}$). It is even more preferable that the part $O_{F\Delta}$ of the surface $O_F$ formed by sputtering coincides with both parts $O_{A/MK}$, $O_{KK}$ ($O_{F\Delta}=O_{A/MK}+O_{KK}$).

4.2.2 Increase in Mass-Based Specific Surface Area

The surprising advantage of the present invention is that step (ii) affords an ASC F having higher conductivity compared to the ASC F' used in step (ii) when used in the electrolysis cell E according to step (iii) and step (iv-β).

More particularly, $S_{MF'}<S_{MF}$, where $S_{MF'}$ is the mass-based specific surface area $S_M$ of the alkali metal cation-conducting solid-state electrolyte ceramic F' before performance of step (ii) and where $S_{MF}$ is the mass-based specific surface area $S_M$ of the alkali metal cation-conducting solid-state electrolyte ceramic F after performance of step (ii). This means that the mass-based specific surface area $S_M$ of the ASC F' subjected to step (ii) is increased during the performance of step (ii) from $S_{MF'}$ to $S_{MF}$ in the ASC F obtained.

The mass-based specific surface area $S_M$ means the surface area A possessed by a material per unit mass m. ($S_M=A/m$, unit: $m^2/kg$).

The comparison of the mass-based specific surface areas $S_{MF'}$ and $S_{MF}$, i.e. the testing of the condition whether $S_{MF'}<S_{MF}$, can be determined by methods known to the person skilled in the art for measuring the BET (Brunauer-Emmett-Teller) surface area, by measuring both ASCs F and F' under the same conditions. Even if the ratio of the two parameters $S_{MF'}$ and $S_{MF}$ is determined under different measurement conditions, the ratio $S_{MF}/S_{MF'}$ measured under particular measurement conditions will essentially be the same as the ratio $S_{MF}/S_{MF'}$ measured under different measurement conditions.

More particularly, in the context of the present invention, the mass-based specific surface areas are carried out via BET measurements to ISO 9277:2010 with $N_2$ (purity 99.99% by volume) as adsorbent at 77.35 K.

Instrument: Quantachrome NOVA 2200e, Quantachrome Instruments.

Sample preparation: degassing of the sample at 60° C. at 1 Pa. The evaluation is especially undertaken via the static volumetric method (according to point 6.3.1 of standard ISO 9277:2010).

In respect of the ratio of $S_{MF'}$ and $S_{MF}$, i.e. the quotient $S_{MF}/S_{MF'}$, the following applies in a preferred embodiment of the present invention:

$S_{MF}/S_{MF'}\geq1.01$, preferably $S_{MF}/S_{MF'}\geq1.1$, preferably $S_{MF}/S_{MF'}\geq1.5$, preferably $S_{MF}/S_{MF'}\geq2.0$, preferably $S_{MF}/S_{MF'}\geq3.0$, preferably $S_{MF}/S_{MF'}\geq5.0$, preferably $S_{MF}/S_{MF'}\geq10$, more preferably $S_{MF}/S_{MF'}\geq20$, more preferably $S_{MF}/S_{MF'}\geq50$, more preferably $S_{MF}/S_{MF'}\geq100$, more preferably $S_{MF}/S_{MF'}\geq150$, more preferably $S_{MF}/S_{MF'}\geq200$, more preferably $S_{MF}/S_{MF'}\geq500$, more preferably $S_{MF}/S_{MF'}\geq1000$.

In another preferred embodiment of the present invention, the quotient $S_{MF}/S_{MF'}$ is in the range from 1.01 to 1000, preferably in the range from 1.1 to 500, more preferably in the range from 1.5 to 200, more preferably in the range from 2.0 to 150, more preferably in the range from 3.0 to 50, more preferably in the range from 5.0 to 25, more preferably in the range from 15 to 25, more preferably in the range from 18 to 22.

4.3 Step (iii)

In step (iii) of the process according to the invention, the ASC F obtained in step (ii) is disposed in an electrolysis cell E.

4.3.1 Electrolysis Cell E

The electrolysis cell E comprises at least one anode chamber $K_A$ and at least one cathode chamber $K_K$, and at least one interposed middle chamber $K_M$. This also includes electrolysis cells E having more than one anode chamber $K_A$ and/or more than one cathode chamber $K_K$ and/or more than one middle chamber $K_M$. Such electrolysis cells in which these chambers are joined to one another in the form of modules are described, for example, in DD 258 143 A3 and US 2006/0226022 A1.

The electrolysis cell E, in a preferred embodiment, comprises an anode chamber $K_A$ and a cathode chamber $K_K$, and an interposed middle chamber $K_M$.

The electrolysis cell E typically has an outer wall $W_A$. The outer wall $W_A$ is especially made from a material selected from the group consisting of steel, preferably rubberized steel, plastic, especially selected from Telene® (thermoset polydicyclopentadiene), PVC (polyvinylchloride), PVC-C (post-chlorinated polyvinylchloride), PVDF (polyvinylidenefluoride). $W_A$ may especially be perforated for inlets and outlets. Within $W_A$ are then the at least one anode chamber $K_A$, the at least one cathode chamber $K_K$ and, in the embodiments in which the electrolysis cell E comprises one, the at least one interposed middle chamber $K_M$.

4.3.1.1 Cathode Chamber $K_K$

The cathode chamber $K_K$ has at least one inlet $Z_{KK}$, at least one outlet $A_{KK}$, and an interior $I_{KK}$ comprising a cathodic electrode $E_K$.

The interior $I_{KK}$ of the cathode chamber $K_K$ is divided from the interior $I_{KM}$ of the middle chamber $K_M$ by the dividing wall W.

The dividing wall W comprises the alkali metal cation-conducting solid-state electrolyte ceramic F, and F makes direct contact with the interior $I_{KK}$ via the surface $O_{KK}$ and with the interior $I_{KM}$ via the surface OA/MK.

4.3.1.1.1 Dividing Wall W

The dividing wall W comprises the alkali metal cation-conducting solid-state electrolyte ceramic F. What is meant by the feature "dividing wall" is that the dividing wall W is liquid-tight. What this means more particularly is that the alkali metal cation-conducting solid-state electrolyte ceramic F encompassed by the dividing wall divides the interior $I_{KK}$ and the interior $I_{KM}$ completely from one another, or comprises multiple alkali metal cation-conducting solid-state electrolyte ceramics which join one another, for example in a gapless manner.

There at least exist no gaps in the dividing wall W through which aqueous solution, alcoholic solution, alcohol or water could flow from $I_{KK}$ into $I_{KM}$ or vice versa.

What is meant by "makes direct contact" in respect of the arrangement of the alkali metal cation-conducting solid-state electrolyte ceramics in the dividing wall W and in the electrolysis cell E and in respect of the surfaces $O_{KK}$ and $O_{A/MK}$ is that there is a theoretical pathway from $I_{KK}$ into $I_{KM}$ that leads completely from $I_{KK}$ via $O_{KK}$ through F to $O_{A/MK}$ and ultimately into $I_{KM}$.

It is preferable that at least 1% of the surface $O_{A/MK}$ is formed by $O_{F\Delta}$ and/or, especially and, at least 1% of the surface $O_{KK}$ by $O_{F\Delta}$.

Even more preferably, at least 10% of the surface $O_{A/MK}$ is formed by $O_{F\Delta}$ and/or, especially and, at least 10% of the surface $O_{KK}$ by $O_{F\Delta}$.

Even more preferably, at least 25% of the surface $O_{A/MK}$ is formed by $O_{F\Delta}$ and/or, especially and, at least 25% of the surface $O_{KK}$ by $O_{F\Delta}$.

Even more preferably, at least 40% of the surface $O_{A/MK}$ is formed by $O_{F\Delta}$ and/or, especially and, at least 40% of the surface $O_{KK}$ by $O_{F\Delta}$.

Even more preferably, at least 50% of the surface $O_{A/MK}$ is formed by $O_{F\Delta}$ and/or, especially and, at least 50% of the surface $O_{KK}$ by $O_{F\Delta}$.

Even more preferably, at least 60% of the surface $O_{A/MK}$ is formed by $O_{F\Delta}$ and/or, especially and, at least 60% of the surface $O_{KK}$ by $O_{F\Delta}$.

Even more preferably, at least 70% of the surface $O_{A/MK}$ is formed by $O_{F\Delta}$ and/or, especially and, at least 70% of the surface $O_{KK}$ by $O_{F\Delta}$.

Even more preferably, at least 80% of the surface $O_{A/MK}$ is formed by $O_{F\Delta}$ and/or, especially and, at least 80% of the surface $O_{KK}$ by $O_{F\Delta}$.

Even more preferably, at least 90% of the surface $O_{A/MK}$ is formed by $O_{F\Delta}$ and/or, especially and, at least 90% of the surface $O_{KK}$ by $O_{F\Delta}$.

Even more preferably, 100% of the surface $O_{A/MK}$ is formed by $O_{F\Delta}$ and/or, especially and, 100% of the surface $O_{KK}$ by $O_{F\Delta}$.

This is advantageous since, as a result, the sputtered surface of F that takes part in the process according to the invention [step (iv-β)], i.e. through which the ion flow takes place in the electrolysis, is particularly large.

4.3.1.1.2 Cathodic Electrode $E_K$

The cathode chamber $K_K$ comprises an interior $I_{KK}$ which in turn comprises a cathodic electrode $E_K$. A useful cathodic electrode $E_K$ of this kind is any electrode familiar to the person skilled in the art that is stable under the conditions of the process according to the invention. These are described, in particular, in WO 2014/008410 A1, paragraph [025] or DE 10360758 A1, paragraph [030]. This electrode $E_K$ may be selected from the group consisting of mesh wool, three-dimensional matrix structure and "balls". The cathodic electrode $E_K$ especially comprises a material selected from the group consisting of steel, nickel, copper, platinum, platinized metals, palladium, carbon-supported palladium, titanium. Preferably, $E_K$ comprises nickel.

4.3.1.1.3 Inlet $Z_{KK}$ and Outlet $A_{KK}$

The cathode chamber $K_K$ also encompasses an inlet $Z_{KK}$ and an outlet $A_{KK}$. This enables addition of liquid, for example the solution $L_2$, to the interior $I_{KK}$ of the cathode chamber $K_K$, and removal of liquid present therein, for example the solution $L_1$. The inlet $Z_{KK}$ and the outlet $A_{KK}$ are attached here to the cathode chamber $K_K$ in such a way that the liquid comes into contact with the cathodic electrode $E_K$ as it flows through the interior $I_{KK}$ of the cathode chamber $K_K$. This is a prerequisite for the solution $L_1$ to be obtained at the outlet $A_{KK}$ in the performance of the process according to the invention when the solution $L_2$ of an alkali metal alkoxide XOR in the alcohol ROH is routed through the interior $I_{KK}$ of the cathode chamber $K_K$.

The inlet $Z_{KK}$ and the outlet $A_{KK}$ may be attached to the electrolysis cell E by methods known to the person skilled in the art, for example by means of holes in the outer wall $W_A$ and corresponding connections (valves) that simplify the introduction and discharge of liquid.

4.3.1.2 Anode Chamber $K_A$

The anode chamber $K_A$ has at least one inlet $Z_{KA}$, at least one outlet $A_{KA}$, and an interior $I_{KA}$ comprising an anodic electrode $E_A$.

The interior $I_{KA}$ of the anode chamber $K_A$ is divided from the interior $I_{KM}$ of the middle chamber $K_M$ by a diffusion barrier D.

4.3.1.2.1 Anodic Electrode $E_A$

The anode chamber $K_A$ comprises an interior $I_{KA}$ which in turn comprises an anodic electrode $E_A$. A useful anodic electrode $E_A$ of this kind is any electrode familiar to the person skilled in the art that is stable under the conditions of the process according to the invention. These are described, in particular, in WO 2014/008410 A1, paragraph [024] or DE 10360758 A1, paragraph [031]. This electrode $E_A$ may consist of one layer or consist of multiple planar layers parallel to one another that may each be perforated or expanded. The anodic electrode $E_A$ especially comprises a material selected from the group consisting of ruthenium oxide, iridium oxide, nickel, cobalt, nickel tungstate, nickel titanate, precious metals such as, in particular, platinum, supported on a support such as titanium or Kovar® (an iron/nickel/cobalt alloy in which the individual components are preferably as follows: 54% by mass of iron, 29% by mass of nickel, 17% by mass of cobalt). Further possible anode materials are especially stainless steel, lead, graphite, tungsten carbide, titanium diboride. Preferably, the anodic electrode $E_A$ comprises a titanium anode coated with ruthenium oxide/iridium oxide ($RuO_2$+$IrO_2$/Ti).

4.3.1.2.2 Inlet $Z_{KA}$ and Outlet $A_{KA}$

The anode chamber $K_A$ also encompasses an inlet $Z_{KA}$ and an outlet $A_{KA}$. This enables addition of liquid, for example the solution $L_3$, to the interior $I_{KA}$ of the anode chamber $K_A$, and removal of liquid present therein, for example the solution $L_4$. The inlet $Z_{KA}$ and the outlet $A_{KA}$ are attached here to the anode chamber $K_A$ in such a way that the liquid comes into contact with the anodic electrode $E_A$ as it flows through the interior $I_{KA}$ of the anode chamber $K_A$. This is a prerequisite for the solution $L_4$ to be obtained at the outlet $A_{KA}$ in the performance of the process according to the invention when the solution $L_3$ of a salt S is routed through the interior $I_{KA}$ of the anode chamber $K_A$.

The inlet $Z_{KA}$ and the outlet $A_{KA}$ may be attached to the electrolysis cell E by methods known to the person skilled in the art, for example by means of holes in the outer wall $W_A$ and corresponding connections (valves) that simplify the introduction and discharge of liquid. The inlet $Z_{KA}$, in particular embodiments, may also be within the electrolysis cell, for example in the form of a perforation in the diffusion barrier D.

4.3.1.3 Middle Chamber $K_M$

The electrolysis cell E has at least one middle chamber $K_M$. The middle chamber $K_M$ lies between cathode chamber $K_K$ and anode chamber $K_A$.

The interior $I_{KA}$ of the anode chamber $K_A$ is divided from the interior $I_{KM}$ of the middle chamber $K_M$ by a diffusion barrier D. $A_{KM}$ is then also connected to the inlet $Z_{KA}$ by a connection $V_{AM}$, such that liquid can be guided from $I_{KM}$ into $I_{KA}$ through the connection $V_{AM}$.

4.3.1.3.1 Diffusion Barrier D

The interior $I_{KM}$ of the middle chamber $K_M$ is divided from the interior $I_{KA}$ of the anode chamber $K_A$ by a diffusion barrier D and divided from the interior $I_{KK}$ of the cathode chamber $K_K$ by the dividing wall W.

The material used for the diffusion barrier D may be any which is stable under the conditions of the process according to the invention and prevents or slows the transfer of protons from the liquid present in the interior $I_{KA}$ of the anode chamber $K_A$ to the interior $I_{KM}$ of the middle chamber $K_M$. The diffusion barrier D used is especially a non-ion-specific dividing wall or a membrane permeable to specific ions. The diffusion barrier D is preferably a non-ion-specific dividing wall.

The material of the non-ion-specific dividing wall is especially selected from the group consisting of fabric, which is especially textile fabric or metal weave, glass, which is especially sintered glass or glass frits, ceramic, especially ceramic frits, membrane diaphragms, and is more preferably a textile fabric or metal weave, especially preferably a textile fabric. The textile fabric preferably comprises plastic, more preferably a plastic selected from PVC, PVC-C, polyvinylether ("PVE"), polytetrafluoroethylene ("PTFE").

If the diffusion barrier D is a "membrane permeable to specific ions", what this means in accordance with the invention is that the respective membrane promotes the diffusion of particular ions therethrough over other ions. More particularly, what this means is membranes that promote the diffusion therethrough of ions of a particular charge type over ions of the opposite charge. Even more preferably, membranes permeable to specific ions also promote the diffusion of particular ions of one charge type over other ions of the same charge type therethrough.

If the diffusion barrier D is a "membrane permeable to specific ions", the diffusion barrier D is especially an anion-conducting membrane or a cation-conducting membrane.

According to the invention, anion-conducting membranes are those that selectively conduct anions, preferably selectively conduct particular anions. In other words, they promote the diffusion of anions therethrough over that of cations, especially over protons; even more preferably, they additionally promote the diffusion of particular anions therethrough over the diffusion of other anions therethrough.

According to the invention, cation-conducting membranes are those that selectively conduct cations, preferably selectively conduct particular cations. In other words, they promote the diffusion of cations therethrough over that of anions; even more preferably, they additionally promote the diffusion of particular cations therethrough over the diffusion of other cations therethrough, more preferably still that of cations that are not protons, more preferably sodium cations, over protons.

What is meant more particularly by "promote the diffusion of particular ions X over the diffusion of other ions Y" is that the coefficient of diffusion (unit: $m^2/s$) of ion type X at a given temperature for the membrane in question is higher by a factor of 10, preferably 100, preferably 1000, than the coefficient of diffusion of ion type Y for the membrane in question.

If the diffusion barrier D is a "membrane permeable to specific ions", it is preferably an anion-conducting membrane since this particularly efficiently prevents the diffusion of protons from the anode chamber $K_A$ into the middle chamber $K_M$.

The anion-conducting membrane used is especially one selective for the anions encompassed by the salt S. Such membranes are known to and can be used by the person skilled in the art.

The salt S is preferably a halide, sulfate, sulfite, nitrate, hydrogencarbonate or carbonate of X, even more preferably a halide.

Halides are fluorides, chlorides, bromides, iodides. The most preferred halide is chloride.

The anion-conducting membrane used is preferably one selective for halides, preferably chloride.

Anion-conducting membranes are described, for example, by M. A. Hickner, A. M. Herring, E. B. Coughlin, Journal of Polymer Science, Part B: Polymer Physics 2013, 51, 1727-1735, by C. G. Arges, V. Ramani, P. N. Pintauro, Electrochemical Society Interface 2010, 19, 31-35, in WO 2007/048712 A2, and on page 181 of the textbook by Volkmar M. Schmidt, Elektrochemische Verfahrenstechnik: Grundlagen, Reaktionstechnik, Prozessoptimierung [Electrochemical Engineering: Fundamentals, Reaction Technology, Process Optimization], 1st edition (8 Oct. 2003).

Even more preferably, anion-conducting membranes used are accordingly organic polymers that are especially selected from polyethylene, polybenzimidazoles, polyether ketones, polystyrene, polypropylene and fluorinated membranes such as polyperfluoroethylene, preferably polystyrene, where these have covalently bonded functional groups selected from $—NH_3^+$, $—NRH_2^+$, $—NR_3^+$, $=NR^+$; $—PR_3^+$, where R is alkyl groups having preferably 1 to 20 carbon atoms, or other cationic groups. They preferably have covalently bonded functional groups selected from $—NH_3^+$, $—NRH_2^+$ and $—NR_3^+$, more preferably selected from $—NH_3^+$ and $—NR_3^+$, even more preferably $—NR_3^+$.

If the diffusion barrier D is a cation-conducting membrane, it is especially a membrane selective for the cations encompassed by the salt S. Even more preferably, the diffusion barrier D is an alkali metal cation-conducting membrane, even more preferably a potassium and/or sodium ion-conducting membrane, most preferably a sodium ion-conducting membrane. Cation-conducting membranes are described, for example, on page 181 of the textbook by Volkmar M. Schmidt, Elektrochemische Verfahrenstechnik: Grundlagen, Reaktionstechnik, Prozessoptimierung, 1st edition (Oct. 8, 2003).

Even more preferably, cation-conducting membranes used are accordingly organic polymers that are especially selected from polyethylene, polybenzimidazoles, polyether ketones, polystyrene, polypropylene and fluorinated membranes such as polyperfluoroethylene, preferably polystyrene and polyperfluoroethylene, where these bear covalently bonded functional groups selected from $—SO_3^-$, $—COO^-$, $—PO_3^{2-}$ and $—PO_2H^-$, preferably $—SO_3^-$ (described in DE 10 2010 062 804 A1, U.S. Pat. No. 4,831,146).

This may be, for example, a sulfonated polyperfluoroethylene (Nafion® with CAS number: 31175-20-9). These are known to the person skilled in the art, for example from WO 2008/076327 A1, paragraph [058], US 2010/0044242 A1, paragraph [0042] or US 2016/0204459 A1, and are commercially available under the Nafion®, Aciplex® F, Flemion®, Neosepta®, Ultrex®, PC-SK® trade names. Neosepta® membranes are described, for example, by S. A. Mareev, D. Yu. Butylskii, N. D. Pismenskaya, C. Larchet, L. Dammak, V. V. Nikonenko, Journal of Membrane Science 2018, 563, 768-776.

If a cation-conducting membrane is used as diffusion barrier D, this may, for example, be a polymer functionalized with sulfonic acid groups, especially of the formula $P_{NAFION}$ below, where n and m may independently be a whole number from 1 to $10^6$, preferably a whole number from 10 to $10^5$, more preferably a whole number from $10^2$ to 104.

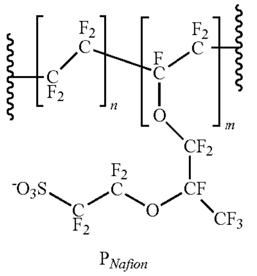

$P_{Nafion}$ 4.3.1.3.2 Inlet $Z_{KM}$ and Outlet $A_{KM}$

The middle chamber $K_M$ also encompasses an inlet $Z_{KM}$ and an outlet $A_{KM}$. This enables addition of liquid, for example the solution $L_3$, to the interior $I_{KM}$ of the middle chamber $K_M$, and transfer of liquid present therein, for example the solution $L_3$, to the anode chamber $K_A$.

The inlet $Z_{KM}$ and the outlet $A_{KM}$ may be attached to the electrolysis cell E by methods known to the person skilled in the art, for example by means of holes in the outer wall $W_A$ and corresponding connections (valves) that simplify the introduction and discharge of liquid. The outlet $A_{KM}$ may also be within the electrolysis cell, for example in the form of a perforation in the diffusion barrier D.

4.3.1.3.3 Connection $V_{AM}$

In the electrolysis cell E, the outlet $A_{KM}$ is connected to the inlet $Z_{KA}$ by a connection $V_{AM}$ in such a way that liquid can be guided from $I_{KM}$ into $I_{KA}$ through the connection $V_{AM}$.

The connection $V_{AM}$ may be formed within the electrolysis cell E and/or outside the electrolysis cell E, and is preferably formed within the electrolysis cell.

1) If the connection $V_{AM}$ is formed within the electrolysis cell E, it is preferably formed by at least one perforation in the diffusion barrier D. This embodiment is preferred especially when the diffusion barrier D used is a non-ion-specific dividing wall, especially a metal weave or textile fabric. This functions as a diffusion barrier D and, on account of the weave properties, has perforations and gaps from the outset that function as connection $V_{AM}$.

2) The embodiment described hereinafter is preferred especially when the diffusion barrier D used is a membrane permeable to specific ions: In this embodiment, the connection $V_{AM}$ is formed outside the electrolysis cell E, preferably formed by a connection of $A_{KM}$ and $Z_{KA}$ that runs outside the electrolysis cell E, especially in that an outlet $A_{KM}$ is formed from the interior of the middle chamber $I_{KM}$, preferably at the base of the middle chamber $K_M$, the inlet $Z_{KM}$ more preferably being at the top end $O_{EM}$ of the middle chamber $K_M$, and an inlet $Z_{KA}$ is formed in the interior $I_{KA}$ of the anode chamber $K_A$, preferably at the base of the anode chamber $K_A$, and these are connected by a conduit, for example a pipe or a hose, preferably comprising a material selected from rubber and plastic. This is advantageous especially since the outlet $A_{KA}$, according to the invention, is formed at the top end $O_{EA}$ of the anode chamber $K_A$.

What is more particularly meant by "outlet $A_{KM}$ at the base of the middle chamber $K_M$" is that the outlet $A_{KM}$ is attached to the electrolysis cell E in such a way that the solution $L_3$ leaves the middle chamber $K_M$ in the direction of gravity.

What is more particularly meant by "inlet $Z_{KA}$ at the base of the anode chamber $K_A$" is that the inlet $Z_{KA}$ is attached to the electrolysis cell E in such a way that the solution $L_3$ enters the anode chamber $K_A$ counter to gravity.

What is more particularly meant by "inlet $Z_{KM}$ at the top end $O_{EM}$ of the middle chamber $K_M$" is that the inlet $Z_{KM}$ is attached to the electrolysis cell E in such a way that the solution $L_3$ enters the middle chamber $K_M$ in the direction of gravity.

What is more particularly meant by "outlet $A_{KA}$ at the top end $O_{EA}$ of the anode chamber $K_A$" is that the outlet $A_{KA}$ is attached to the electrolysis cell E in such a way that the solution $L_4$ leaves the anode chamber $K_A$ counter to gravity.

This embodiment is particularly advantageous and therefore preferred when the outlet $A_{KM}$ is formed by the base of the middle chamber $K_M$, and the inlet $Z_{KA}$ by the base of the anode chamber $K_A$. This arrangement makes it possible in a particularly simple manner to remove gases formed in the anode chamber $K_A$ from the anode chamber $K_A$ with $L_4$, in order to then separate them further.

When the connection $V_{AM}$ is formed outside the electrolysis cell E, $Z_{KM}$ and $A_{KM}$ are especially arranged at opposite ends of the outer wall $W_A$ of the middle chamber $K_M$ (i.e., for example, $Z_{KM}$ at the base and $A_{KM}$ at the top end $O_{EM}$ of the electrolysis cell E or vice versa) and $Z_{KA}$ and $A_{KA}$ are arranged at opposite ends of the outer wall $W_A$ of the anode chamber $K_A$ (i.e. $Z_{KA}$ at the base and $A_{KA}$ at the top end $O_{EA}$ of the electrolysis cell E), as shown more particularly in FIG. 3A. By virtue of this geometry, $L_3$ must flow through the two chambers $K_M$ and $K_A$. It is possible here for $Z_{KA}$ and $Z_{KM}$ to be formed on the same side of the electrolysis cell E, in which case $A_{KM}$ and $A_{KA}$ are automatically also formed on the same side of the electrolysis cell E. Alternatively, $Z_{KA}$ and $Z_{KM}$ may be formed on opposite sides of the electrolysis cell E, in which case $A_{KM}$ and $A_{KA}$ are then automatically also formed on opposite sides of the electrolysis cell E.

3) When the connection $V_{AM}$ is formed within the electrolysis cell E, this may especially be implemented in that one side ("side A") of the electrolysis cell E, which is the top end $O_E$, comprises the inlet $Z_{KM}$ and the outlet $A_{KA}$, and the diffusion barrier D extends proceeding from this side ("side A") into the electrolysis cell E, but does not quite reach up to the opposite side ("side B") of the electrolysis cell E from side A, which is then the base of the electrolysis cell E, and at the same time covers 50% or more of the height of the three-chamber cell E, preferably 60% to 99% of the height of the three-chamber cell E, more preferably 70% to 95% of the height of the three-chamber cell E, even more preferably 80% to 90% of the height of the three-chamber cell E, more preferably still 85% of the height of the three-chamber cell E. Because the diffusion barrier D does not touch side B of the three-chamber cell E, a gap thus arises between diffusion barrier D and the vessel $B_E$ on side B of the three-chamber cell E. In that case, the gap is the connection $V_{AM}$. By virtue of this geometry, $L_3$ must flow completely through the two chambers $K_M$ and $K_A$.

These embodiments best assure that the aqueous salt solution $L_3$ flows past the acid-sensitive solid-state electrolyte before it comes into contact with the anodic electrode $E_A$, which results in the formation of acids.

According to the invention, "base of the electrolysis cell E" is the side of the electrolysis cell E through which a solution (e.g. $L_3$ in the case of $A_{KM}$ in FIG. 3A) exits from the electrolysis cell E in the same direction as gravity, or the side of the electrolysis cell E through which a solution (e.g. $L_2$ in the case of $Z_{KK}$ in FIGS. 2A, 3A and 3B and $L_3$ in the case of $A_{KA}$ in FIGS. 2A, 2B and 3A) is supplied to the electrolysis cell E counter to gravity.

According to the invention, "top end $O_E$ of the electrolysis cell E" is the end of the electrolysis cell E through which a solution (e.g. $L_4$ in the case of $A_{KA}$ and $L_1$ in the case of $A_{KK}$ in all figures) exits from the electrolysis cell E counter to gravity, or the end of the electrolysis cell E through which a solution (e.g. $L_3$ in the case of $Z_{KM}$ in FIGS. 3A and 3B) is supplied to the electrolysis cell E in the same direction as gravity.

4.3.1.4 Arrangement of the Dividing Wall W in the Electrolysis Cell E

The dividing wall W is arranged in the electrolysis cell E such that the alkali metal cation-conducting solid-state electrolyte ceramic F encompassed by the dividing wall W makes direct contact with the interior $I_{KK}$ via the surface $O_{KK}$.

This means that the dividing wall W is arranged in the electrolysis cell E such that, when the interior $I_{KK}$ is completely filled with solution $L_2$, the solution $L_2$ contacts (i.e. wets) the surface $O_{KK}$ of the alkali metal cation-conducting solid-state electrolyte ceramic F encompassed by the dividing wall W, such that ions (e.g. alkali metal ions such as sodium, lithium) can enter the solution $L_2$ from the alkali metal cation-conducting solid-state electrolyte ceramic F encompassed by the dividing wall W via the surface $O_{KK}$.

In addition, the dividing wall W is arranged in the electrolysis cell E such that the alkali metal cation-conducting solid-state electrolyte ceramic F encompassed by the dividing wall W makes direct contact with the interior $I_{KM}$ via the surface $O_{A/MK}$.

What this means is as follows: the electrolysis cell E comprises at least one middle chamber $K_M$, and the dividing wall W adjoins the interior $I_{KM}$ of the middle chamber $K_M$.

The dividing wall W is arranged in the electrolysis cell E such that, when the interior $I_{KM}$ is completely filled with solution $L_3$, the solution $L_3$ contacts (i.e. wets) the surface $O_{A/MK}$ of the alkali metal cation-conducting solid-state electrolyte ceramic F encompassed by the dividing wall W, such that ions (e.g. alkali metal ions such as sodium, lithium) from the solution $L_3$ can enter the alkali metal cation-conducting solid-state electrolyte ceramic F encompassed by the dividing wall W via the surface OA/MK.

4.4 Process Steps According to the Invention

The present invention relates to a process for producing a solution $L_1$ of an alkali metal alkoxide XOR in the alcohol ROH, where X is an alkali metal cation and R is an alkyl radical having 1 to 4 carbon atoms. The process is conducted in an electrolysis cell E.

X is preferably selected from the group consisting of $Li^+$, $K^+$, $Na^+$, more preferably from the group consisting of $K^+$, $Na^+$. Most preferably, $X=Na^+$.

R is preferably selected from the group consisting of n-propyl, iso-propyl, ethyl and methyl, more preferably from the group consisting of ethyl and methyl. R is most preferably methyl.

The steps (β1), (β2), (β3) that proceed simultaneously are conducted.

4.4.1 Step (β1)

In step (β1), a solution $L_2$ comprising the alcohol ROH, preferably comprising an alkali metal alkoxide XOR and alcohol ROH, is routed through $I_{KK}$. In the cases in which $O_{KK}$ encompasses at least a portion of $O_{F\Delta}$, the solution $L_2$ makes direct contact here with the surface $O_{F\Delta}$. More particularly, the solution $L_2$ then makes direct contact with the entire surface $O_{F\Delta}$ encompassed by $O_{KK}$.

This means that, in the cases in which $O_{KK}$ encompasses the entire surface $O_{F\Delta}$, $L_2$ makes direct contact with at least part of the surface $O_{F\Delta}$, and, in the cases in which $O_{KK}$ encompasses only part of the surface $O_{F\Delta}$, $L_2$ makes direct contact with at least part of the surface $O_{F\Delta}$ encompassed by $O_{KK}$.

This preferably means that, in the cases in which $O_{KK}$ encompasses the entire surface $O_{F\Delta}$, $L_2$ makes direct contact with the whole surface $O_{F\Delta}$, and, in the cases in which $O_{KK}$ encompasses only part of the surface $O_{F\Delta}$, $L_2$ makes direct contact with the whole part of the surface $O_F$A encompassed by $O_{KK}$.

Solution $L_2$ is preferably free of water. What is meant in accordance with the invention by "free of water" is that the weight of water in solution $L_2$ based on the weight of the alcohol ROH in solution $L_2$ (mass ratio) is ≤1:10, more preferably ≤1:20, even more preferably ≤1:100, even more preferably ≤0.5:100.

If solution $L_2$ comprises XOR, the proportion by mass of XOR in solution $L_2$, based on the overall solution $L_2$, is especially >0% to 30% by weight, preferably 5% to 20% by weight, more preferably 10% to 20% by weight, more preferably 10% to 15% by weight, most preferably 13% to 14% by weight, at the very most preferably 13% by weight.

If solution $L_2$ comprises XOR, the mass ratio of XOR to alcohol ROH in solution $L_2$ is especially in the range of 1:100 to 1:5, more preferably in the range of 1:25 to 3:20, even more preferably in the range of 1:12 to 1:8, even more preferably 1:10.

4.4.2 Step (β2)

In step (β2), a neutral or alkaline aqueous solution $L_3$ of a salt S comprising X as cation is routed through $I_{KM}$, then via $V_{AM}$, then through $I_{KA}$. In the cases in which $O_{A/MK}$ encompasses at least a portion of $O_{F\Delta}$, the solution $L_3$ makes direct contact here with the surface $O_{F\Delta}$. More particularly, the solution $L_3$ then makes direct contact with the entire surface $O_{F\Delta}$ encompassed by $O_{A/MK}$.

This means that, in the cases in which $O_{A/MK}$ encompasses the entire surface $O_{F\Delta}$, $L_3$ makes direct contact with at least part of the surface $O_{F\Delta}$, and, in the cases in which $O_{A/MK}$ encompasses only part of the surface $O_{F\Delta}$, $L_3$ makes direct contact with at least part of the surface $O_{F\Delta}$ encompassed by $O_{A/MK}$.

This preferably means that, in the cases in which $O_{A/MK}$ encompasses the entire surface $O_{F\Delta}$, $L_3$ makes direct contact with the whole surface $O_{F\Delta}$, and, in the cases in which $O_{A/MK}$ encompasses only part of the surface $O_{F\Delta}$, $L_3$ makes direct contact with the whole part of the surface $O_{F\Delta}$ encompassed by OA/MK.

The salt S is preferably a halide, sulfate, sulfite, nitrate, hydrogencarbonate or carbonate of X, even more preferably a halide.

Halides are fluorides, chlorides, bromides, iodides. The most preferred halide is chloride.

The pH of the aqueous solution $L_3$ is ≥7.0, preferably in the range of 7 to 12, more preferably in the range of 8 to 11, even more preferably 10 to 11, most preferably 10.5.

The proportion by mass of salt S in solution $L_3$ is preferably in the range of >0% to 20% by weight, preferably 1% to 20% by weight, more preferably 5% to 20% by weight, even more preferably 10% to 20% by weight, most preferably 20% by weight, based on the overall solution $L_3$.

4.4.3 Step (β3)

In step (β3), a voltage is then applied between $E_A$ and $E_K$.

This results in transfer of current from the charge source to the anode, transfer of charge via ions to the cathode and ultimately transfer of current back to the charge source. The charge source is known to the person skilled in the art and is typically a rectifier that converts alternating current to direct current and can generate particular voltages via voltage transformers.

This in turn has the following consequences:

- the solution $L_1$ is obtained at the outlet $A_{KK}$ with a higher concentration of XOR in $L_1$ than in $L_2$,
- an aqueous solution $L_4$ of S is obtained at the outlet $A_{KA}$, with a lower concentration of S in $L_4$ than in $L_3$.

In step (β3) of the process, in particular, such a voltage is applied that such a current flows that the current density (=ratio of the current supplied to the electrolysis cell to the area of the solid-state electrolyte in contact with the anolyte present in the interior $I_{KM}$) is in the range from 10 to 8000 $A/m^2$, more preferably in the range from 100 to 2000 $A/m^2$, even more preferably in the range from 300 to 800 $A/m^2$, and even more preferably is 494 $A/m^2$. This can be determined in a standard manner by the person skilled in the art. The area of the solid-state electrolyte in contact with the anolyte present in the interior $I_{KM}$ of the middle chamber $K_M$ is especially 0.00001 to 10 $m^2$, preferably 0.0001 to 2.5 $m^2$, more preferably 0.0002 to 0.15 $m^2$, even more preferably 2.83 $cm^2$.

It is preferable that both $O_{A/MK}$ and $O_{KK}$ encompass part of the surface $O_{F\Delta}$. Step (β3) of the process is more preferably performed when the interior $I_{KM}$ is laden with $L_3$ and the interior $I_{KK}$ with $L_2$ at least to such an extent that $L_3$ and $L_2$ make direct contact with the surface $O_{F\Delta}$ of the alkali metal cation-conducting solid-state electrolyte ceramic F encompassed by the dividing wall W. This is preferable since, as a result, the surface $O_{F\Delta}$ obtained as a result of the treatment in step (ii) within the two surfaces $O_{A/MK}$ and $O_{KK}$ takes part in the electrolysis process, and the advantageous properties of the alkali metal cation-conducting solid-state electrolyte ceramic F, which are manifested in an increase in conductivity and hence an increase in current density at the same voltage, have a particularly positive effect.

The fact that transfer of charge takes place between $E_A$ and $E_K$ in step (β3) implies that $I_{KK}$, $I_{KM}$ and $I_{KA}$ are simultaneously laden with $L_2$ and $L_3$ respectively such that they cover the electrodes $E_A$ and $E_K$ to such an extent that the circuit is complete.

This is the case especially when a liquid stream of $L_3$ is routed continuously through $I_{KM}$, $V_{AM}$ and $I_{KA}$ and a liquid stream of $L_2$ through $I_{KK}$, and the liquid stream of $L_3$ covers electrode $E_A$ and the liquid stream of $L_2$ covers electrode $E_K$ at least partly, preferably completely.

In a further preferred embodiment, the process is performed continuously, i.e. step (β1) and step (β2) are performed continuously, while applying voltage as per step (β3).

After performance of step (β3), solution $L_1$ is obtained at the outlet $A_{KK}$, wherein the concentration of XOR in $L_1$ is higher than in $L_2$. If $L_2$ already comprised XOR, the concentration of XOR in $L_1$ is preferably 1.01 to 2.2 times, more preferably 1.04 to 1.8 times, even more preferably 1.077 to 1.4 times, even more preferably 1.077 to 1.08 times, higher than in $L_2$, most preferably 1.077 times higher than in $L_2$, where the proportion by mass of XOR in $L_1$ and in $L_2$ is more preferably in the range from 10% to 20% by weight, even more preferably 13% to 14% by weight.

An aqueous solution $L_4$ of S is obtained at the outlet $A_{KA}$, with a lower concentration of S in $L_4$ than in $L_3$.

The concentration of the cation X in the aqueous solution $L_3$ is preferably in the range of 3.5 to 5 mol/1, more preferably 4 mol/1. The concentration of the cation X in the aqueous solution $L_4$ is more preferably 0.5 mol/1 lower than that of the aqueous solution $L_3$ used in each case.

More particularly, steps (β1) to (β3) of the process are conducted at a temperature of 20° C. to 70° C., preferably 35° C. to 65° C., more preferably 35° C. to 60° C., even more preferably 35° C. to 50° C., and at a pressure of 0.5 bar to 1.5 bar, preferably 0.9 bar to 1.1 bar, more preferably 1.0 bar.

In the course of performance of steps (β1) to (β3) of the process, hydrogen is typically formed in the interior $I_{KK}$ of cathode chamber $K_K$, which can be removed from the cell together with solution $L_1$ via the outlet $A_{KK}$. The mixture of hydrogen and solution $L_1$ can then, in a particular embodiment of the present invention, be separated by methods known to the person skilled in the art. When the alkali metal compound used is a halide, especially chloride, it is possible for chlorine or another halogen gas to form in the interior $I_{KA}$ of the anode chamber $K_A$, and this can be removed from the cell together with solution $L_4$ via outlet $A_{KK}$. In addition, it is also possible for oxygen or/and carbon dioxide to form, which can likewise be removed. The mixture of chlorine, oxygen and/or $CO_2$ and solution $L_4$ can then, in a particular embodiment of the present invention, be separated by methods known to the person skilled in the art. It is then likewise possible, after the chlorine, oxygen and/or $CO_2$ gases have been separated from solution $L_4$, to separate these from one another by methods known to the person skilled in the art.

4.4.4 Additional Advantages of Steps (β1) to (β3)

This performance of steps (β1) to (β3) brings further surprising advantages that were not to be expected in the light of the prior art. Steps (β1) to (β3) of the process according to the invention protect the acid-labile solid-state electrolyte from corrosion without, as in the prior art, having to sacrifice alkoxide solution from the cathode space as buffer solution. Thus, these process steps are more efficient than the procedure described in WO 2008/076327 A1, in which the product solution is used for the middle chamber, which reduces the overall conversion.

5. EXAMPLES

5.1 Comparative Example 1

Sodium methoxide (SM) was produced via a cathodic process, with supply of 20% by weight NaCl solution (in water) in the anode chamber and of 10% by weight methanolic SM solution in the cathode chamber. This electrolysis cell consisted of three chambers, as shown in FIG. 3A.

The connection between middle chamber and anode chamber was established by a hose mounted at the base of the electrolysis cell. The anode chamber and middle chamber were separated by a 33 $cm^2$ cation exchange membrane (Asahi Kasei, sulfonic acid groups on polymer). Cathode chamber and middle chamber were separated by a ceramic of the NaSICON type with an area of 33 $cm^2$. The ceramic had a chemical composition of the formula $Na_{3.4}Zr_{2.0}Si_{2.4}P_{0.6}O_{12}$.

The NaSICON ceramic used in Comparative Example 1, before being disposed within the cell, was cut with a further ceramic of equal dimensions from the same block.

The anolyte was transferred through the middle chamber into the anode chamber. The flow rate of the anolyte was 1 l/h, and that of the catholyte 1 l/h. The temperature was 60° C.

The voltage was varied within a range from 0 to 8 V while recording the current.

It was also observed that a pH gradient developed in the middle chamber over a prolonged period, which is attributable to the migration of the ions to the electrodes in the course of the electrolysis and the spread of the protons formed in further reactions at the anode. This local increase in pH is undesirable since it can attack the solid-state electrolyte and can lead to corrosion and fracture of the solid-state electrolyte specifically in the case of very long periods of operation.

5.2 Comparative Example 2

Comparative Example 1 is repeated with a two-chamber cell comprising just one anode chamber and one cathode chamber, with the anode chamber having been separated from the cathode chamber by the ceramic of the NaSICON type. The arrangement corresponds to that shown in FIG. 2A. This electrolysis cell thus does not contain any middle chamber.

This is reflected in even faster corrosion of the ceramic compared to Comparative Example 1, which leads to a more rapid rise in the voltage curve when the electrolysis is to be conducted at constant current over a defined period of time.

5.3 Inventive Example 1

Comparative Example 1 is repeated.

For this purpose, the other NaSICON ceramic that is cut from the same block as that used in Comparative Example 1 is subjected to a sputtering process as follows:

The NaSICON ceramic is first introduced into the vacuum chamber of the sputtering device as target in front of the cathode. Subsequently, the pressure in the chamber is lowered to $10^{-6}$ mbar with the aid of a combination of rotation pump and turbo pump, and a gentle feed stream of argon is established such that the pressure in the chamber is $10^{-2}$ mbar. For generation of the plasma, an AC voltage of 2 kV is applied between anode and cathode. The frequency of the AC voltage is 13.56 MHz, in order to lower the resistance of the nonconductive ceramic to such an extent that a plasma can form. At the same time, at this frequency, the electrons can still follow the applied field, but ions have too much inertia to follow the rapidly alternating field. The $Ar^+$ ions formed in the plasma are accelerated in the direction of the cathode by the electrical field, where they meet the NaSICON ceramic and knock out individual constituents from the surface. The sputtering current is 40 mA.

This increases the mass-based specific surface area of the NaSICON ceramic by a factor of ~20.

Thereafter, the electrolysis process according to Comparative Example 1 is repeated, with the surfaces that form on the ceramic in contact with the interiors of the cathode chamber and middle chamber.

It is found that a significantly lower voltage had to be applied over the duration of the electrolysis at the same current as in Comparative Example 1.

5.4 Comparative Example 3

Comparative Example 2 is repeated using an electrolysis cell in which the solid-state electrolyte ceramic treated according to Inventive Example 1 is used. Here too, a significant reduction in voltage compared to Comparative Example 2 is necessary at the same current.

5.5 Result

The pretreatment (sputtering) of the NaSICON ceramic and the exposure of the sputtered surfaces in the interiors of the anode chamber or middle chamber and the cathode chamber surprisingly increases the conductivity of the solid-state electrolyte.

The use of the three-chamber cell in the process according to the invention also prevents the corrosion of the solid-state electrolyte, and at the same time there is no need to sacrifice alkali metal alkoxide product for the middle chamber and the voltage is kept constant. These advantages that are already apparent from the comparison of the two Comparative Examples 1 and 2 underline the surprising effect of the use of the electrolysis cell comprising at least one middle chamber in the process according to the invention.

6. REFERENCE SYMBOLS IN THE FIGURES

| Component | Abbreviation | Reference symbols in FIGS. |
|---|---|---|
| Electrolysis cell | E | <1> |
| Anode chamber | $K_A$ | <11> |
| Inlet | $Z_{KA}$ | <110> |
| Outlet | $A_{KA}$ | <111> |
| Interior | $I_{KA}$ | <112> |
| Anodic electrode | $E_A$ | <113> |
| Cathode chamber | $K_K$ | <12> |
| Inlet | $Z_{KK}$ | <120> |
| Outlet | $A_{KK}$ | <121> |
| Interior | $I_{KK}$ | <122> |
| Cathodic electrode | $E_K$ | <123> |
| Middle chamber | $K_M$ | <13> |
| Inlet | $Z_{KM}$ | <130> |
| Outlet | $A_{KM}$ | <131> |
| Interior | $I_{KM}$ | <132> |
| Diffusion barrier | D | <14> |
| Connection | $V_{AM}$ | <15> |
| Dividing wall | W | <16> |
| Solid-state electrolyte ceramic after step (ii) | F | <18> |
| Dust particles of the solid-state electrolyte ceramic F | | <185> |
| Surface of F | $O_F$ | <180> |
| Subregion of $O_F$ which, in the electrolysis cell E, makes direct contact with the interior $I_{KM}$ of the middle chamber $K_M$ | $O_{A/MK}$ | <181> |
| Subregion of $O_F$ which, in the electrolysis cell E, makes direct contact with the interior $I_{KK}$ of the cathode chamber $K_K$ | $O_{KK}$ | <182> |
| Subregion of $O_F$ which forms as a result of sputtering in step (ii) of the process according to the invention; this subregion distinguishes $O_F$ from $O_{F'}$ | $O_{F\Delta}$ | <183> |
| Solid-state electrolyte ceramic before step (ii) | F' | <19> |
| Surface of F' | $O_{F'}$ | <190> |
| Subregion of $O_{F'}$ | | <191> |
| Subregion of $O_{F'}$ | | <192> |
| Alkali metal alkoxide XOR in the alcohol ROH | $L_1$ | <21> |
| Solution comprising the alcohol ROH | $L_2$ | <22> |

-continued

| Component | Abbreviation | Reference symbols in FIGS. |
|---|---|---|
| Neutral or alkaline, aqueous solution of a salt S comprising X as cation | $L_3$ | <23> |
| Aqueous solution of S, where $[S]_{L4} < [S]_{L3}$. | $L_4$ | <24> |
| Noble gas cations | $N^+$ | <30> |
| Substrate film (e.g. titanium) | | <40> |
| Outer wall | $W_A$ | <80> |
| Process chamber for sputtering | | <90> |

The invention claimed is:

1. A process for producing a solution $L_1$ <21> of an alkali metal alkoxide XOR in an alcohol ROH, in an electrolysis cell E <1>, where X is an alkali metal cation and R is an alkyl radical having 1 to 4 carbon atoms, said process comprising the following steps:

(i) providing an alkali metal cation-conducting solid-state electrolyte ceramic, F' <19>, having a surface $O_{F'}$<190>;

(ii) removing a portion of the alkali metal cation-conducting solid-state electrolyte ceramic F' <19> by sputtering with noble gas cations $N^+$ <30>, which produces an alkali metal cation-conducting solid-state electrolyte ceramic F <18> having a surface $O_F$ <180> which differs from surface $O_{F'}$ <190> in at least one subregion $O_{FA}$ <183>, wherein: the surface $O_F$ <180> comprises the surfaces $O_{A/MK}$ <181> and $O_{KK}$ <182>, and wherein $O_{A/MK}$ <181> and/or $O_{KK}$ <182> comprise at least a portion of $O_{FA}$ <183>;

(iii) arranging the alkali metal cation-conducting solid-state electrolyte ceramic F <18> in the electrolysis cell E <1>, wherein said electrolysis cell comprises at least one anode chamber $K_A$ <11>, at least one cathode chamber $K_K$ <12> and at least one interposed middle chamber $K_M$ <13>;

wherein the at least one anode chamber $K_A$ <11> comprises:
- at least one inlet $Z_{KA}$ <110>;
- at least one outlet $A_{KA}$ <111>;
- and an interior $I_{KA}$ <112> with an anodic electrode $E_A$ <113>;

the at least one cathode chamber $K_K$ <12> comprises:
- at least one inlet $Z_{KK}$ <120>;
- at least one outlet $A_{KK}$ <121>;
- and an interior $I_{KK}$ <122> with a cathodic electrode $E_K$ <123>;

and the at least one middle chamber $K_M$ <13> comprises:
- at least one inlet $Z_{KM}$ <130>;
- at least one outlet $A_{KM}$ <131>;
- and an interior $I_{KM}$ <132>;

wherein $I_{KA}$ <112> and $I_{KM}$ <132> are divided from one another by a diffusion barrier D <14>, and $A_{KM}$ <131> is connected by a connection $V_{AM}$ <15> to the inlet $Z_{KA}$ <110>, such that liquid can be passed from $I_{KM}$ <132> into $I_{KA}$ <112> via the connection $V_{AM}$ <15>;

and $I_{KK}$ <122> and $I_{KM}$ <132> are divided from one another by a dividing wall W <16> comprising the alkali metal cation-conducting solid-state electrolyte ceramic F <18>, wherein F <18> makes direct contact with the interior $I_{KK}$ <122> via the surface $O_{KK}$ <182> and with the interior $I_{KM}$ <132> via the surface $O_{A/MK}$ <181>;

(iv-β) and wherein the following steps (β1), (β2), (β3) proceed simultaneously:

(β1) a solution $L_2$ <22> comprising the alcohol ROH is routed through $I_{KK}$ <122>, wherein when $O_{KK}$ <182> includes at least a portion of $O_{FA}$ <183>, and the solution $L_2$ <22> makes direct contact with the at least one subregion $O_{FA}$ <183>;

(β2) a neutral or alkaline, aqueous solution $L_3$ <23> of a salt S comprising X as cation is routed through $I_{KM}$ <132>, then via $V_{AM}$ <15> through $I_{KA}$ <112>, where, when $O_{A/MK}$<181> includes at least a portion of $O_{FA}$ <183>, and the solution $L_{3}$<23> makes direct contact with at least one subregion $O_{FA}$ <183>;

(β3) voltage is applied between $E_A$ <113> and $E_K$ <123>;

thereby providing solution $L_1$ <21> at the outlet $A_{KK}$ <121>, with a higher concentration of XOR than in $L_2$ <22> and providing aqueous solution $L_4$ <24> at the outlet $A_{KA}$ <111>, with a lower concentration of S than in $L_3$ <23>.

2. The process of claim 1, wherein: $S_{MF'} < S_{MF}$; and wherein $S_{MF'}$ is the mass-based specific surface area SM of the alkali metal cation-conducting solid-state electrolyte ceramic F' before performance of step (ii) and $S_{MF}$ is the mass-based specific surface area SM of the alkali metal cation-conducting solid-state electrolyte ceramic F after performance of step (ii).

3. The process of claim 2, wherein the quotient $S_{MF}/S_{MF'} \geq 1.01$.

4. The process of claim 1, wherein at least 1% of surface $O_{A/MK}$ <181> is formed by $O_{FA}$ <183> and/or at least 1% of surface $O_{KK}$ <182> is formed by $O_{FA}$ <183>.

5. The process of claim 1, wherein the alkali metal cation-conducting solid-state electrolyte ceramic F'<19> has a structure of the formula:

$$M^{I}_{1+2w+x-y+z}M^{II}_{w}M^{III}_{x}Zr^{IV}_{2-w-x-y}M^{V}_{y}(SiO_4)_z(PO_4)_{3-z}$$

where $M^I$ is selected from $Na^+$ and $Li^+$;

$M^{II}$ is a divalent metal cation;

$M^{III}$ is a trivalent metal cation;

$M^V$ is a pentavalent metal cation;

the Roman indices I, II, III, IV, V indicate the oxidation numbers in which the respective metal cations exist;

wherein w, x, y, z are real numbers, and wherein $0 \leq x < 2$, $0 \leq y < 2$, $0 \leq w < 2$, $0 \leq z < 3$;

and wherein w, x, y, z are chosen such that $1+2w+x-y+z \geq 0$ and $2-w-x-y \geq 0$.

6. The process of claim 1, wherein X is selected from the group consisting of $Li^+$, $Na^+$, and $K^+$.

7. The process of claim 6, wherein $X=Na^+$.

8. The process of claim 1, wherein S is a halide, sulfate, sulfite, nitrate, hydrogencarbonate or carbonate of X.

9. The process of claim 8, wherein S is a chloride of X.

10. The process of claim 1, wherein R is selected from the group consisting of methyl and ethyl.

11. The process of claim 10, wherein R=methyl.

12. The process of claim 1, wherein the connection $V_{AM}$ <15> is formed within the electrolysis cell E <1>.

13. The process of claim 1, wherein the connection $V_{AM}$ <15> is formed outside the electrolysis cell E <1>.

14. The process of claim 1, wherein $O_{A/MK}$ <181> and $O_{KK}$ <182> comprise at least a portion of $O_{FA}$ <183>.

15. The process of claim 14, wherein at least 1% of the surface $O_{A/MK}$ <181> is formed by $O_{FA}$ <183> and at least 1% of the surface $O_{KK}$ <182> is formed by $O_{FA}$ <183>.

16. The process of claim 4, wherein the alkali metal cation-conducting solid-state electrolyte ceramic F' <19> has a structure of the formula:

$$M^{I}_{1+2w+x-y+z}M^{II}_{w}M^{III}_{x}Zr^{IV}_{2-w-x-y}M^{V}_{y}(SiO_4)_z(PO_4)_{3-z}$$

where $M^{I}$ is selected from $Na^+$ and $Li^+$;

$M^{II}$ is a divalent metal cation;

$M^{III}$ is a trivalent metal cation;

$M^{V}$ is a pentavalent metal cation;

the Roman indices I, II, III, IV, V indicate the oxidation numbers in which the respective metal cations exist;

wherein w, x, y, z are real numbers, where $0 \le x < 2, 0 \le y < 2, 0 \le w < 2, 0 \le z < 3$;

and wherein w, x, y, z are chosen such that $1+2w+x-y+z \ge 0$ and $2-w-x-y \ge 0$.

17. The process of claim 16, wherein X is selected from the group consisting of $Li^+$, $Na^+$, $K^+$.

18. The process of claim 17, wherein $X=Na^+$.

19. The process of claim 17, wherein S is a halide, sulfate, sulfite, nitrate, hydrogencarbonate or carbonate of X.

20. The process of claim 19, wherein S is a chloride of X and R is selected from the group consisting of methyl and ethyl.

* * * * *